US011074662B2

(12) United States Patent
Chappell

(10) Patent No.: US 11,074,662 B2
(45) **Date of Patent: *Jul. 27, 2021**

(54) SIMULATED NETWORK SYSTEM AND METHOD FOR RELATING USERS OF REAL-WORLD E-COMMERCE AND OTHER USER NETWORK SYSTEMS TO INFORMATION

(71) Applicant: Intellidimension, Inc., Brattleboro, VT (US)

(72) Inventor: Geoff Chappell, Belfast, ME (US)

(73) Assignee: Intellidimension, Inc., Brattleboro, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,455

(22) Filed: Jan. 12, 2020

(65) Prior Publication Data

US 2020/0151830 A1 May 14, 2020

Related U.S. Application Data

(63) Continuation of application No. 16/222,159, filed on Dec. 17, 2018, now Pat. No. 10,552,922, which is a continuation of application No. 15/167,715, filed on May 27, 2016, now Pat. No. 10,157,430.

(60) Provisional application No. 62/166,806, filed on May 27, 2015.

(51) Int. Cl.
*G06F 9/44* (2018.01)
*G06Q 50/00* (2012.01)

(52) U.S. Cl.
CPC .................................. *G06Q 50/01* (2013.01)

(58) Field of Classification Search
CPC .................................................... G06Q 50/01
USPC ............................................................ 703/21
See application file for complete search history.

(56) References Cited

U.S. PATENT DOCUMENTS 8,713,143 B2 * 4/2014 Centola .................. G06Q 50/01 709/223
2012/0158630 A1 * 6/2012 Zaman ..................... G06N 5/04 706/21
2014/0330548 A1 * 11/2014 Appel .................... G06Q 50/01 703/6

* cited by examiner

*Primary Examiner* — Timothy A Mudrick
(74) *Attorney, Agent, or Firm* — Birch Tree IP Law & Strategy PLLC; Jamie T. Gallagher

(57) ABSTRACT

Simulated network system and method for comparing one or more real-world computer-based or e-commerce network user to a computerized simulated network for providing information to the one or more real-world users. The information provided is based on information obtained via simulated sharing and/or spreading of simulated items amongst simulated users in the computerized simulated network using a first vocabulary and comparison of a profile for a real-world user with profiles of simulated users using the same first vocabulary.

20 Claims, 18 Drawing Sheets

FIG. 18
Top Topics
America American Americans Australia
Bernie Sanders British California
Canada Canadian China Christian
Clinton Congress Debbie Wasserman
Schultz Democratic Donald Trump EU
Europe Florida France French Germany
Google GOP Hillary Hillary Clinton
India Ireland Islamic Italian Jimmy Kimmel
London Microsoft Muslim NASA New York
Obama Republican Russia Russian
Sanders Saudi Saudi Arabia State
Department Trump U.S. UK United
States US Washington

SIMULATED NETWORK SYSTEM AND METHOD FOR RELATING USERS OF REAL-WORLD E-COMMERCE AND OTHER USER NETWORK SYSTEMS TO INFORMATION

RELATED APPLICATION DATA

This application is a continuation application of U.S. patent application Ser. No. 16/222,159, filed Dec. 17, 2018, entitled "Simulated Network System and Method for Relating Users of Real-World E-Commerce and Other User Network Systems to Information," which is a continuation application of U.S. patent application Ser. No. 15/167,715, filed May 27, 2016, entitled "Simulated Network System and Method Having Simulated User Profiles And Item Profiles Based On The Same Vocabulary For Information Integration With Real World E-Commerce And Other User Network Systems," each of which is incorporated by reference herein in its entirety. This application also claims the benefit of priority of U.S. Provisional Patent Application Ser. No. 62/166,806, filed on May 27, 2015, and titled "Simulated Social Network System and Method," which is incorporated by reference herein in its entirety.

FIELD OF INVENTION

The present invention generally relates to the field of simulated user networks. In particular, the present invention is directed to a simulated user network system and method for relating users of real-world e-commerce and other user network systems to information.

BACKGROUND

Computerized social networks have a benefit that is derived from large size. Larger sized networks, such as Facebook, have a significant number of users making a significant number of interactions with other users and content items on the network to provide the operators of the network with social data that can reasonably approach a point of meaningful information that can then be utilized to present to its users recommendations, item listings, and other information based on how other users in the network have behaved. Smaller networks and e-commerce systems typically do not have the volume of users or user interactions to effectively generate their own meaningful data. Additionally, the topology, homophilous nature, and dimensionality of the structure of the users and network may be insufficient for a desired social signal. Further, real users can provide additional problems, such as difficulty in building a critical mass, scaling problems with too many users, users not interacting with consistent regularity, too many similar users (which results in something like over-fitting in a machine learning application), and/or other problems.

SUMMARY OF THE DISCLOSURE

In one implementation, a method of comparing a real-world computer-based social or e-commerce network user to a computerized simulated network is provided. The method includes defining using a computerized simulated network a comparison profile for each of one or more real-world users of a real-world computer-based e-commerce system or a real-world computer-based user network, the computerized simulated network including a simulated user profile associated with each of a plurality of nodes of the computerized simulated network and a historical record of the interaction of the plurality of simulated user profiles in the computerized simulated network, each of the plurality of simulated user profiles being for a user of a set of simulated users, a proximity of each simulated user profile in the plurality of nodes being based on the similarity of simulated user profiles; associating each comparison profile to a set of comparison simulated user profiles of the computerized simulated network, the comparison simulated user profiles including one or more of the simulated user profiles selected based on profile similarity; and providing to the one or more real-world users a listing of information based on a portion of the historical record corresponding to the set of comparison simulated user profiles.

In another implementation, a machine-readable hardware storage medium including machine-executable instructions for performing a method of comparing a real-world computer-based social or e-commerce network user to a computerized simulated network is provided. The instructions include a set of instructions for defining using a computerized simulated network a comparison profile for each of one or more real-world users of a real-world computer-based e-commerce system or a real-world computer-based user network, the computerized simulated network including a simulated user profile associated with each of a plurality of nodes of the computerized simulated network and a historical record of the interaction of the plurality of simulated user profiles in the computerized simulated network, each of the plurality of simulated user profiles being for a user of a set of simulated users, a proximity of each simulated user profile in the plurality of nodes being based on the similarity of simulated user profiles; a set of instructions for associating each comparison profile to a set of comparison simulated user profiles of the computerized simulated network, the comparison simulated user profiles including one or more of the simulated user profiles selected based on profile similarity; and a set of instructions for providing to the one or more real-world users a listing of information based on a portion of the historical record corresponding to the set of comparison simulated user profiles.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
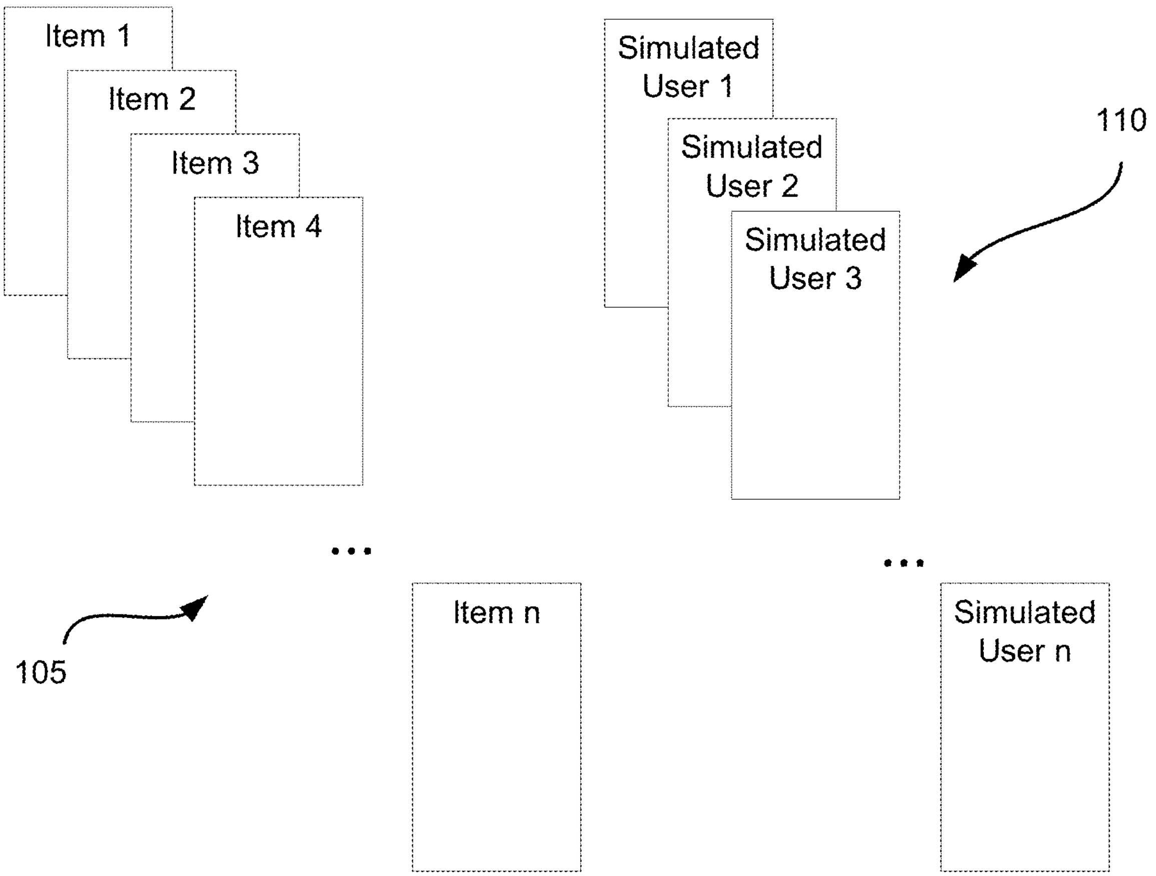
FIG. 1 illustrates a graphical representation of an exemplary set of simulated item profiles and a set of simulated user profiles.

The current disclosure provides systems and methods related to a simulated computer-based network. As used herein, the term simulated network and the term simulated computer-based network include a simulated social network and other simulated networks that allow for the assigning of simulated user profiles to nodes of the network and simulated sharing/spreading of item profiles from one node to another as described herein. In one implementation, a simulated computer-based social network includes simulated items and simulated users each having computerized profiles that are based on a vocabulary of terms that are used to describe the simulated items.

Such a simulated network can provide one or more benefits to real-world computer-based e-commerce systems, social networks, other networks, and/or users of such real-world systems. Examples of benefits that may be achieved by exemplary implementations of a simulated network of the current disclosure include, but are not limited to, providing information to a real-world system that mimics activity that may take place by real users on such system, providing a recommendation of an item to a user of such a system (e.g., an item that might be of predicted interest to a user), provide a listing of items for viewing and/or consideration by a user of such a system, providing information related to promoting one or more actions (e.g., within varied contexts, such as viewing an article or purchasing a product), providing a volume of user activity information not available to a system having a relatively small amount of users, and any combinations thereof. Example real-world systems and networks include, but are not limited to, a website selling goods, an online service providing access to audio and/or visual content (e.g., an audio/visual streaming content provider), an electronic system providing recommendations to users about a good or service, an online provider of publications (e.g., news, entertainment, etc.), a social network, and any combinations thereof. Such systems may deliver their information to and/or interact with their real-world users in a variety of ways. Example ways of communicating with real-world users include, but are not limited to, via the Internet, over another computerized network, via a computer application (e.g., a mobile device "app"), and any combinations thereof.

Various items can be represented in a simulated network of the current disclosure. Example items include, but are not limited to a publication, an audio content item, a video content item, a photographic content item, a product for sale, a service for sale, and any combination thereof. Examples of a publication include, but are not limited to, a news article, a political advocacy document, an academic journal publication, a scientific study, an advertisement, and any combinations thereof. In one exemplary aspect, an item simulated via a simulated network of the current disclosure may represent a corresponding item in a real-world environment. In one such example, an item simulated via a simulated network of the current disclosure is an item available for sale on a real-world e-commerce system. In another such example, an item simulated via a simulated network of the current disclosure is an article published over the Internet by a real-world network system, such as an Internet news agency.

Simulated items are represented in a simulated network using a computer-based item profile having terms based on a vocabulary. A vocabulary includes terms and, optionally some level of structure (e.g., a hierarchical structure) of such terms. The terms describe one or more aspects of an item to be simulated. Example terms in a vocabulary include, but are not limited to, a classification, a sub-classification, a category, a sub-category, a topic, a sub-topic, an attribute, and any combinations thereof. In one example, a term vocabulary includes one or more classifications with each classification including one or more topics and/or attributes. The word (classification, category, topic, attribute, etc.) utilized to describe a type of term may be interchangeable and may not be necessary for describing the actual term. These words are used in part herein to assist with description of various vocabularies. An item profile may include one or more terms without regard to the word label for the type of term. For example, an item profile may include one or more higher hierarchical terms (e.g., a classification term, a category term), one or more lower hierarchical terms (e.g., a sub-classification, a sub-category, a topic, an attribute), and any combination thereof. In one example of generating a simulated network, an item profile is assigned one or more terms from a vocabulary. In another example of generating a simulated network, an item profile is assigned one or more terms from terms selected from the group of a classification, a sub-classification, a category, a sub-category, a topic, a sub-topic, an attribute, and any combinations thereof. An item profile may include any number of terms. The number of terms of an item profile can vary from simulated network to simulated network and/or from user profile to user profile within a simulated network. In one example, a number of terms of an item profile is determined randomly. In another example, a number of terms of an item profile is a predetermined number.

Simulated users are represented in a simulated network using a computer-based simulated user profile that includes terms based on the same vocabulary utilized to describe the simulated items in the same simulated network. Terms for each simulated user profile in a set of simulated user profiles of a simulated network may be determined in a variety of ways. Example ways of determining terms for a simulated user profile include, but are not limited to, a random assignment of one or more terms to a profile, a probabilistic assignment of one or more terms to a profile (e.g., based on the relative probabilistic relationship of the terms in the item profiles), a statistically accurate assignment of one or more terms to a profile, use of a weighting factor for one or more terms in assigning terms to a profile, and any combinations thereof. A simulated user profile may include any number of terms. The number of terms of a simulated user profile can vary from simulated network to simulated network and/or from user profile to user profile within a simulated network. In one example, a number of terms of a simulated user profile is determined randomly. In another example, a number of terms of a simulated user profile is a predetermined number. Any number of simulated user profiles may be included in a simulated network of the current disclosure. Exemplary factors to consider in determining the number of simulated user profiles include, but are not limited to, having a number of simulated users represented to adequately model one or more desired outcomes of simulated sharing and/or spreading of items represented via item profiles; having a number of simulated users capable of having terms consistent with the distributions of the terms in the item profiles of the simulated network, having a number of simulated users to span the desired topic space represented by the simulated network, having a sufficient number of simulated users so that a desired average degree can be achieved while also achieving desired overall network structure (e.g. if a degree of 50 is desired (every node connected to 50 neighbors) and a sufficient number of distinct clusters is desired, then many more than 50 nodes is required), having s sufficient number of simulated users so that an overall level of share/spread activity on the network is achieved while maintaining a reasonable share/spread count per simulated user, having a sufficient number of simulated users so that a target percentage of simulated items can be shared one or more times on the network, and any combinations thereof.

Various weighting factors can be utilized in weighting the probability of inclusion of a given term from a vocabulary in a simulated user profile. Example weighting factors include, but are not limited to, a randomly generated factor, a factor of the popularity of a term within the vocabulary in the item profiles of the simulated network, a factor based on the number of item profiles having the term relative to the total number of item profiles, a factor based on the number of item profiles having the term relative to other terms in the vocabulary, a factor based on the number of item profiles having the term relative to other terms in a grouping of terms in the vocabulary (e.g., in a category containing the term), and any combinations thereof. An item profile and/or a simulated user profile may include data representing a weighting factor for one or more of the terms included in the profile.

Clustering of terms in a real-world environment (e.g., a real-world system used to derive items for representation in a simulated network) may be utilized in determining which terms to associate with a simulated user profile. For example, if two or more terms appear together in a statistically significant level of occurrence in real-world item represented by the item profiles of a simulated network, the assignment of the same two or more terms to the same simulated user profile may occur at an increased probability in defining simulated user profiles (e.g., at the same probability as existing in real-world items). Other levels of probabilistic weighting of the occurrence of clustering may also be used in associating terms with simulated user profiles.

Figure 2:
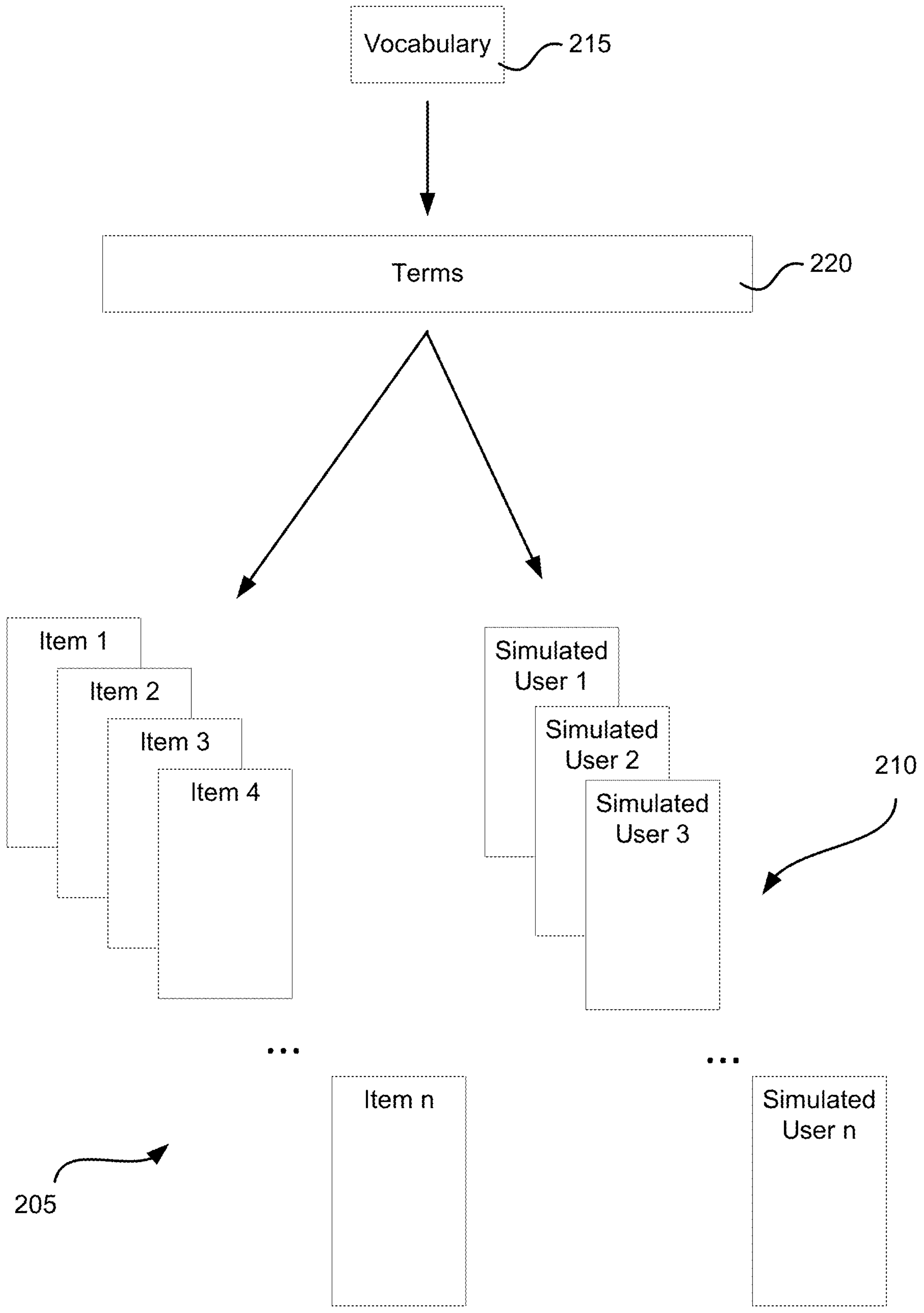
FIG. 2 illustrates a graphical representation of another exemplary set of simulated item profiles and simulated user profiles.

FIG. 1 is a graphical representation of a set of simulated item profiles 105 for n number of items 1, 2, 3, 4, . . . n and a set of simulated user profiles 110 for n number of users 1, 2, 3, . . . n. The number of item profiles 105 and simulated user profiles 110 are not required to be the same. FIG. 2 is a graphical representation of a set of simulated item profiles 205 and simulated user profiles 210 that are similar to item profiles 105 and user profiles 110 of FIG. 1. Item profiles 205 and user profiles 210 each include a set of terms based on a vocabulary 215 that includes a set of terms 220 that are based on characteristics of the items represented by the simulated user profiles 210.

Figure 3:
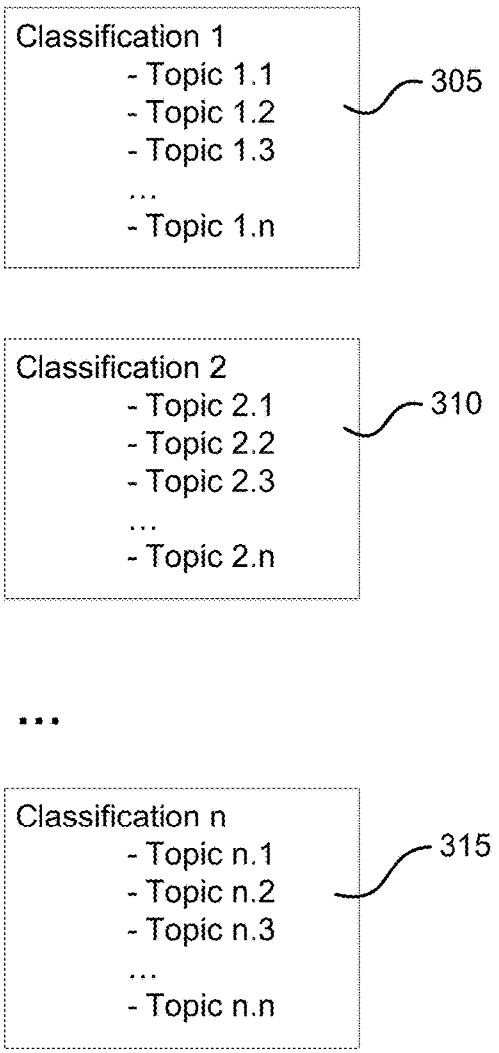
FIG. 3 illustrates a graphical representation of an exemplary vocabulary having terms organized into n number of classifications.

FIG. 3 is a graphical representation of an exemplary vocabulary having terms organized into n number of classifications shown as classification 305, classification 310, and classification 315. Classification 305 includes topics 1.1, 1.2, 1.3, . . . 1.n. Classification 310 includes topics 2.1, 2.2, 2.3, . . . 2.n. Classification 315 includes topics n.1, n.2, n.3, n.n. The number of topics in each classification and the number of classifications are not required to be the same.

Figure 4:
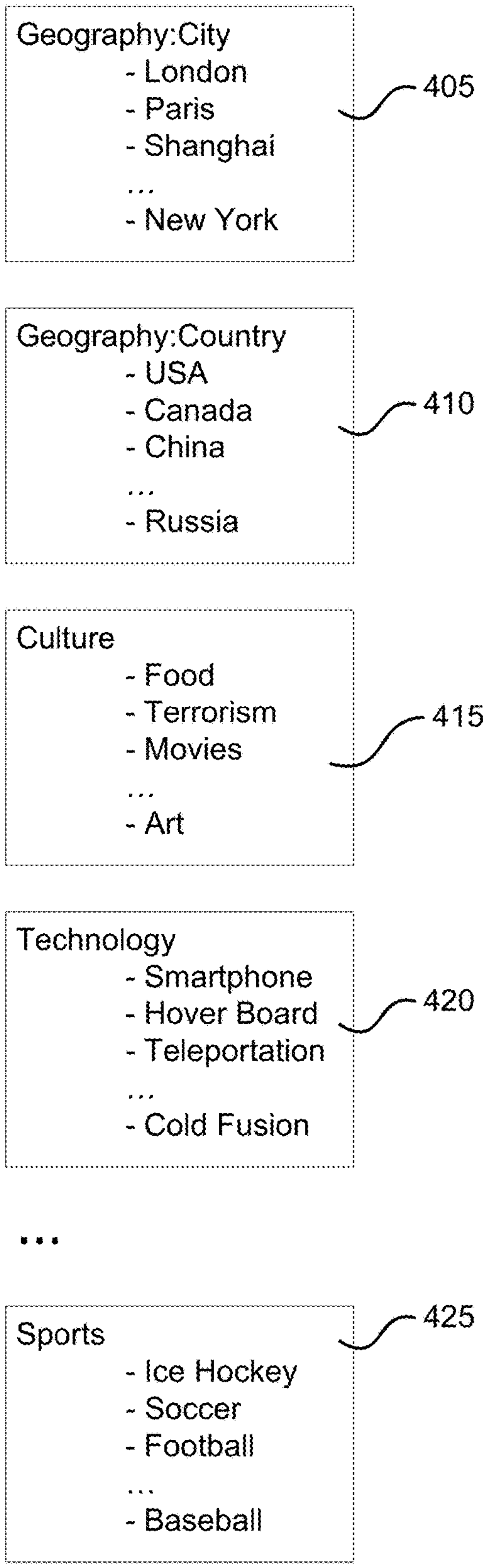
FIG. 4 illustrates a graphical representation of another exemplary vocabulary having terms organized into classifications.

FIG. 4 is a graphical representation of another exemplary vocabulary having terms organized into classifications 405, 410, 415, 420, and 425. Classification 405 has a classification term value of "Geography:City" and includes topic term values of "London," "Paris," "Shanghai," and "New York." Classification 410 has a classification term value of "Geography:Country" and includes topic term values of "USA," "Canada," "China," and "Russia." Classification 415 has a classification term value of "Culture" and includes topic term values of "Food," "Terrorism," "Movies," and "Art." Classification 420 has a classification term value of "Technology" and include topic term values of "Smartphone," "Hover Board," "Teleportation," and "Cold Fusion." Classification 425 has a classification term value of "Sports" and includes topic term values of "Ice Hockey," "Soccer," "Football," and "Baseball." The illustration is shown with the use of ellipses to indicate that one or more additional classifications and one or more additional topics are included, but not shown, in the vocabulary. Terms from the vocabulary of the example shown in FIG. 4 may be utilized to define item profiles and simulated user profiles of an exemplary implementation of a simulated network of the current disclosure. In one example, terms of the vocabulary of the example shown in FIG. 4 are utilized to describe a set of simulated items profiles of a simulated network in which the item profiles represent real-world news articles and are utilized to describe a set of simulated user profiles in the simulated network. In one such example, the terms of the vocabulary assigned to an item profile are terms appearing in the corresponding real-world article and the terms assigned to the simulated user profiles are determined using a value of relative occurrence of the terms across the set of item profiles. For example, an item profile representing a news article about Chinese citizens playing soccer for a London-based association soccer team may have terms "China," "Sports," "Soccer," and "London."

Figure 5:
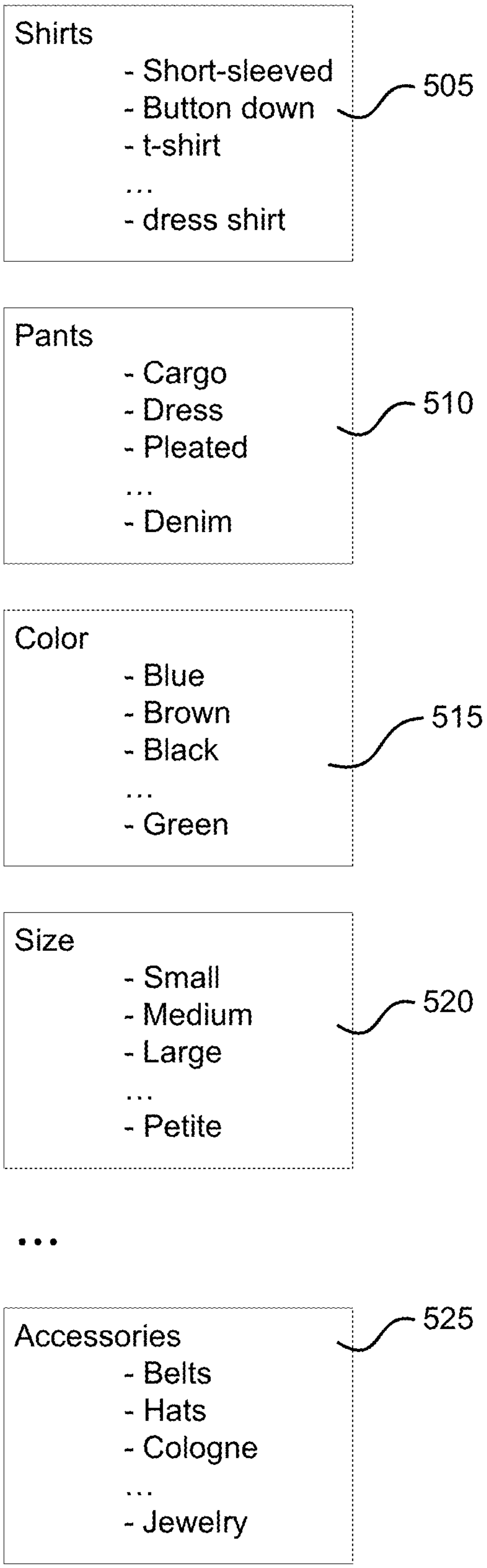
FIG. 5 illustrates a graphical representation of yet another exemplary vocabulary having terms organized into classifications.

FIG. 5 is a graphical representation of yet another exemplary vocabulary having terms organized into classifications 505, 510, 515, 520, and 525. Classification 505 has a classification term value of “Shirts” and includes topic term values of “Short-sleeved,” “Button down,” “t-shirt,” and “Dress Shirt.” Classification 510 has a classification term value of “Pants” and includes topic term values of “Cargo,” “Dress,” “Pleated,” and “Denim.” Classification 515 has a classification term value of “Color” and includes topic term values of “Blue,” “Brown,” “Black,” and “Green.” Classification 520 has a classification term value of “Size” and include topic term values of “Small,” “Medium,” “Large,” and “Petite.” Classification 525 has a classification term value of “Accessories” and includes topic term values of “Belts,” “Hats,” “Cologne,” and “Jewelry.” The illustration is shown with the use of ellipses to indicate that one or more additional classifications and one or more additional topics are included, but not shown, in the vocabulary. Terms from the vocabulary of the example shown in FIG. 5 may be utilized to define item profiles and simulated user profiles of an exemplary implementation of a simulated network of the current disclosure. In one example, terms of the vocabulary of the example shown in FIG. 5 are utilized to describe a set of simulated items profiles of a simulated network in which the item profiles represent real-world products for sale on an e-commerce system and are utilized to describe a set of simulated user profiles in the simulated network. In one such example, the terms of the vocabulary assigned to an item profile are terms describing a characteristic of a corresponding product in the real-world e-commerce system. For example, a real-world product may be a green, button-down shirt of size large and the corresponding item profile would include terms “green,” “shirt,” “button-down,” and “large.”

As discussed above, the prevalence of terms corresponding to real-world items may be utilized in associating those terms with item profiles and simulated user profiles in a simulated network. The following shows an exemplary data coding of an example item profile of a simulated network:

```
{
    “id”: “4613600”
    “vectors”: {
        “terms”: {
            “avgreview”: 0.8799999952316284,
            “cat_abcat0100000”: 0.5,
            “cat_abcat0101000”: 0.5,
            “cat_abcat0101001”: 0.5,
            “cat_cat00000”: 0.5,
            “cls_MID FPTV 32-45”: 0.5,
            “color_Black”: 0.5,
            “dpt_VIDEO”: 0.5,
            “mfg_Samsung”: 1,
            “sku_4613600”: 1,
            “subcls_MID 32\” LCD”: 0.5,
            “t_720p”: 0.25,
            “t_black”: 0.25,
            “t_browser”: 0.25,
            “t_class”: 0.25,
            “t_diag”: 0.25,
            “t_hdtv”: 0.25,
            “t_includ”: 0.25,
            “t_led”: 0.25,
            “t_resolutionsmart”: 0.25,
            “t_samsung”: 0.25,
            “t_smart”: 0.25,
            “t_tv”: 0.25,
            “t_web”: 0.25,
            “type_HardGood”: 0.5
        },
```

In this example shown above, the “id” of the particular item profile is given as 4613600. This item profile corresponds to a real-world television product from an e-commerce system. Terms associated with the item profile are shown under the “terms” heading with the term values enclosed in quotations, such as “color Black.” In many of the example term values a descriptor is appended in the term value, such as the “color” before the “Black.” In this example, the “t” appended before certain terms, such as “black,” “browser,” “hdtv,” represents that the term is a term that appears in a descriptive text of the product (e.g., on the e-commerce system website, as an advertisement, etc.). Additionally, a predetermined numerical weighting factor is listed after each term. In this example, the terms from the item textual content are predetermined to be weighted lower than terms related to the color of the item and the item manufacturer, “Samsung.” Various predetermined weightings considerations can be utilized in order to provide differing desired probabilities of similarity comparisons (described further below) between profiles (i.e., giving more desired weight to some terms over others).

The following shows another exemplary data coding of an example item profile of a simulated network:

```
{
    “id”: “659252”,
    “vectors”: {
        “terms”: {
            “Earth/noun”: 0.017241379246115685,
            “activity/noun”: 0.008620689623057842,
            “agree/verb”: 0.0021551724057644606,
            “be/verb”: 0.006465517450124025,
            “carbon/noun”: 0.008620689623057842,
            “change/noun”: 0.008620689623057842,
            “climate/noun”: 0.0258620698004961,
            “cloud/noun”: 0.0258620698004961,
            “cloudier/adjective”: 0.0008620689623057842,
            “co2/noun”: 0.017241379246115685,
            “cooler/adjective”: 0.0008620689623057842,
            “dioxide/noun”: 0.008620689623057842,
            “disagree/verb”: 0.0021551724057644606,
            “earth/noun”: 0.017241379246115685,
            “expect/verb”: 0.0021551724057644606,
            “extra/adjective”: 0.0008620689623057842,
            “future/adjective”: 0.00008620689914096147,
            “future/noun”: 0.0008620689623057842,
            “gas/noun”: 0.017241379246115685,
            “greenhouse/noun”: 0.008620689623057842,
            “have/verb”: 0.0021551724057644606,
            “human/adjective”: 0.0008620689623057842,
            “indicate/verb”: 0.0021551724057644606,
            “level/noun”: 0.008620689623057842,
            “new/adjective”: 0.0008620689623057842,
            “offset/verb”: 0.0021551724057644606,
            “other/adjective”: 0.0008620689623057842,
            “past/noun”: 0.0008620689623057842,
            “planet/noun”: 0.008620689623057842,
            “point/noun”: 0.008620689623057842,
            “portion/noun”: 0.008620689623057842,
            “predict/verb”: 0.0021551724057644606,
            “reflect/verb”: 0.0021551724057644606,
            “result/noun”: 0.008620689623057842,
            “rise/verb”: 0.004310344811528921,
            “s_science”: 0.0071042319759726524,
            “scientist/noun”: 0.008620689623057842,
            “sensitive/adjective”: 0.0017241379246115685,
            “space/noun”: 0.008620689623057842,
            “study/noun”: 0.017241379246115685,
            “suggest/verb”: 0.004310344811528921,
            “sunlight/noun”: 0.008620689623057842,
            “temperature/noun”: 0.008620689623057842,
            “warm/verb”: 0.004310344811528921,
            “warming/noun”: 0.008620689623057842
        },
```

In this example shown immediately above, the "id" of the particular item profile is given as 659252. This item profile corresponds to a real-world publication from an Internet publication service. Terms associated with the item profile are shown under the "terms" heading with the term values enclosed in quotations, such as "cooler/adjective." The terms in this example represent words appearing in the Internet publication. In implementations of an item profile having terms corresponding to words appearing in a publication or other textual item it is not necessary that the item profile have a term to correspond with every word in the publication. In certain examples, occurrence thresholds can be utilized to limit terms to those corresponding to words that occur a predetermined desired minimum number of times in the article, a predetermined desired minimum percentage of occurrence relative to other words in the article, and/or some other desired occurrence relationship. In the example item profile 659252 shown above, a category term is included having the value "s_science," where the "s" is appended to indicate a category level term. Also, in this example, terms are appended with an indication of the part of speech for the corresponding word. Such an appending is an option that may provide value in distinguishing differing usage of the same word. Further in this example, the terms are followed by a weighting factor that indicates the relative occurrence of the corresponding word in relation to other words in the publication. While the examples above of different codings for profiles show particular exemplary ways to organize terms within a profile, an item profile and/or a simulated user profile may utilize any structure, programming language, or other design choice consistent with delivering one or more of the characteristics and functionalities described herein.

Simulated user profiles are associated with a node of a computer-based simulated network (e.g., one simulated user profile per each node). Various network topologies are known and can be created with any number of nodes with varying degrees of interrelationship between nodes by those of ordinary skill in light of the teachings of the current disclosure. One exemplary aspect that may be considered in selecting the characteristics of a network topology is the degree to which the topology allows for the sharing and spreading of items from one node of the network to another. In one example, a network topology is selected and designed to have characteristics that will encourage sharing and spreading of items from one node of the network topology to another. Example network topologies for a simulated network include, but are not limited to, a small world model, a Watts and Strogatz model, and any combinations thereof.

Figure 6:
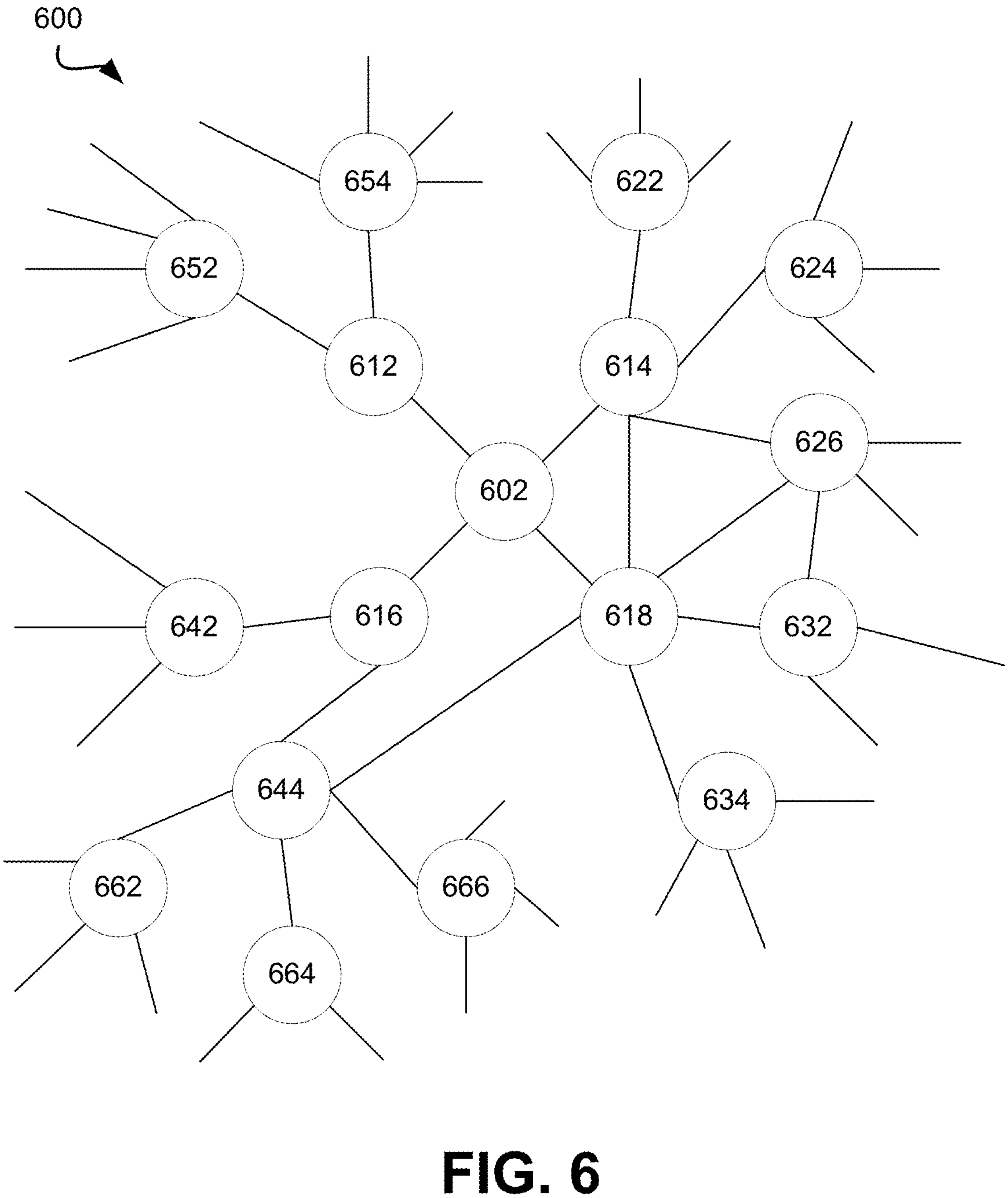
FIG. 6 illustrates a graphical representation of a portion of an exemplary network topology.

FIG. 6 illustrates a graphical representation of a portion of an exemplary network topology 600. Network 600 includes a node 602 connected to nodes 612, 614, 616, and 618. Node 614 is further connected to nodes 622, 624, 626, and 632. Node 618 is further connected to nodes 634 and 644, and is also connected to node 632. Node 616 is connected to node 642 and is also connected to node 644. Node 612 is further connected to nodes 652 and 654. Node 644 is further connected to nodes 662, 664, and 666. Each of nodes 622, 624, 626, 632, 634, 642, 652, 654, 662, 664, and 666 are further connected to other nodes not shown. Each of the nodes of network 600 has neighboring nodes to which it is directly connected. For example, node 614 has neighboring nodes 602, 618, 622, 624, and 626. It is contemplated that exemplary implementations of a simulated network can have nodes with any number of neighbors (e.g., 100+ neighbors each). As will be described further below, simulated user profiles are associated with the nodes of a simulated network and simulated item represented by item profiles are shared and/or spread from node to node. A node will share/spread an item to one or more of its neighbors (or in certain implementations, to all of its neighbors). For example, node 614 will share and/or spread an item to nodes 602, 618, 622, 624, and 626. Network 600 is shown in a two-dimensional fashion. Many known network topologies may be understood as multi-dimensional.

Figure 7:
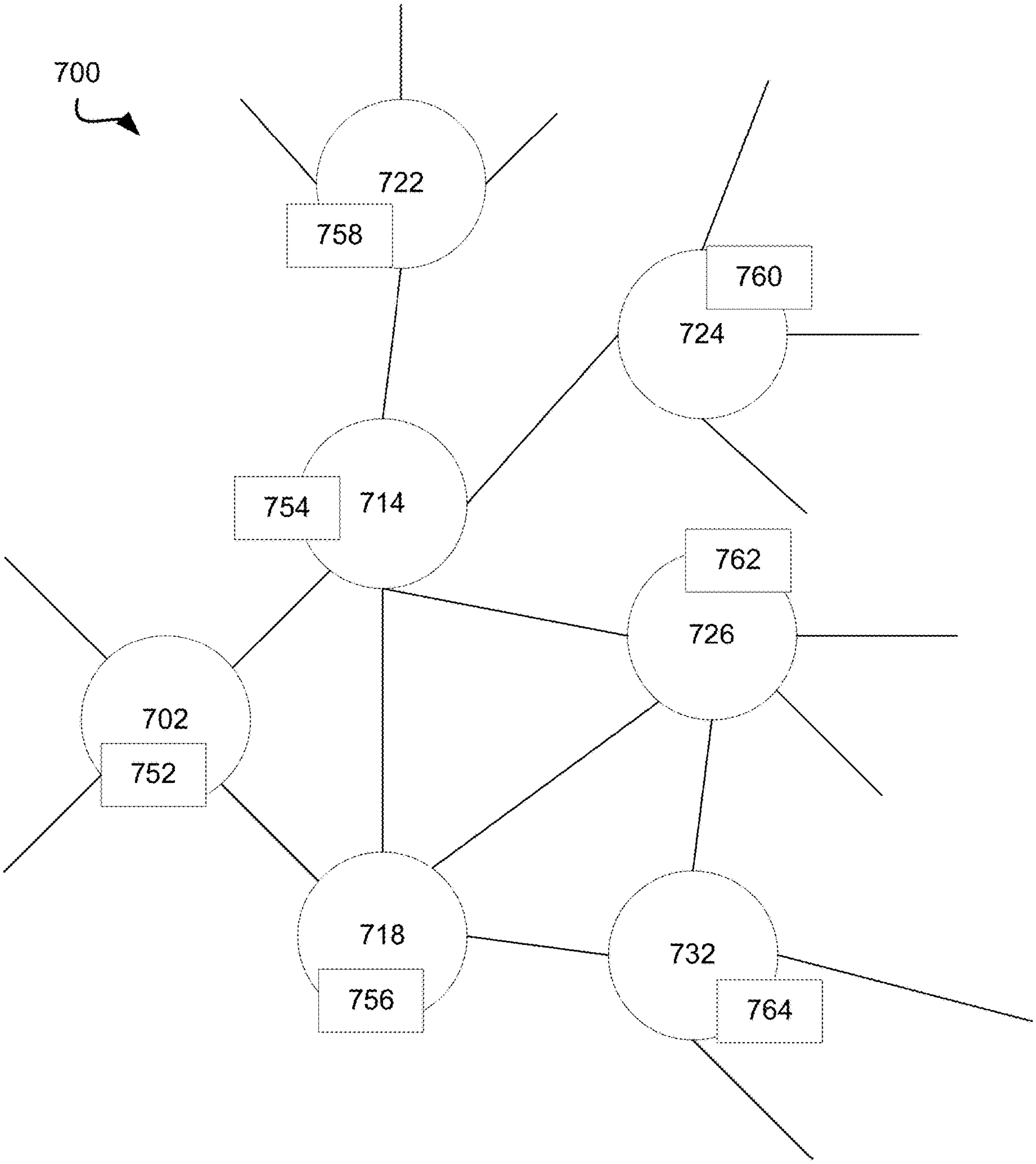
FIG. 7 illustrates a graphical representation of a portion of one implementation of a simulated network.

FIG. 7 illustrates a graphical representation of a portion of one implementation of a simulated network 700. The graphical representation shows nodes 702, 714, 718, 722, 724, 726, and 732. In one implementation aspect of a simulated network as described herein, simulated user profiles are associated with nodes of a simulated network based on the similarity of terms in simulated user profiles positioned proximate each other. In one example, the similarity of a simulated user profile at a node to simulated user profiles positioned at neighboring nodes is utilized to determine locations of simulated user profiles in a simulated network. In another example, the similarity of simulated user profiles at a node to simulated user profiles positioned at neighboring nodes and one or more other nodes proximate the node under consideration to determine locations of simulated user profiles in a simulated network.

A variety of known similarity comparison techniques are known, any of which may be used in determining a level of similarity between profiles (e.g., between one or more simulated user profiles and/or one or more item profiles. Examples of similarity comparison techniques include, but are not limited to, a cosine similarity, a vector distance technique, a distance between multi-dimensional points, and any combinations thereof. In one example, a cosine similarity technique is utilized to determine a level of similarity of terms of a simulated user profile to another simulated user profile in a simulated network. In another example, a cosine similarity technique is utilized to determine a level of similarity of terms of a simulated user profile to an item profile in a simulated network.

In one example of associating simulated user profiles with nodes of a simulated network, simulated user profiles are associated with nodes of a simulated network and determining if the overall similarity level across the simulated network meets a desired level. One exemplary aspect that may possibly be considered in determining overall similarity level of the placement of simulated user profiles is a level of design encouragement towards a desired level of item sharing between nodes. If the initial placement of simulated user profiles is not to a desired level in this example, one or more of the associated simulated user profiles is swapped to have an association with another node and a new overall similarity level is determined. The swapping of one or more simulated user profiles can be repeated until (a) a predetermined overall level of similarity is achieved and/or (b) there is substantially no change in overall similarity level for a predetermined (e.g., 1, 2, 3, etc.) number of swapping cycles.

In one example of associating simulated user profiles with nodes of a simulated network, a homophily score for the simulated network can be utilized to determine a desired level of homophily of the simulated network. In such an example, simulated user profiles are associated with nodes of a simulated network and determining a homophily score for the simulated network. Techniques for determining the homophily of a network are known. Examples of criteria that can be utilized in a homophily determination include, but are not limited to, a cosine similarity, a vector distance technique, a distance between multi-dimensional points, a sum of all similarity scores between all connected nodes in the simulated network, and any combinations thereof. A homophily score may utilize similarities between terms of a simulated user profile associated with one node and terms of a simulated user profile associated with another node proximate to the first. In one example, a homophily score for a simulated network is derived from a sum of all similarity scores between all connected nodes in the simulated network. If the initial placement of simulated user profiles is not to a desired level of optimum homophily, one or more of the associated simulated user profiles is swapped to have an association with another node and a new homophily score is determined. The swapping of one or more simulated user profiles can be repeated until (a) a predetermined homophily score is achieved and/or (b) there is substantially no change in homophily score for a predetermined (e.g., 1, 2, 3, etc.) number of swapping cycles.

Referring again to FIG. 7, a simulated user profile 752 is associated with node 702, a simulated user profile 754 is associated with node 714, a simulated user profile 756 is associated with node 718, a simulated user profile 758 is associated with node 722, a simulated user profile 760 is associated with node 724, a simulated user profile 762 is associated with node 726, and a simulated user profile is associated with node 732.

Example ways of associating a simulated user profile with a node of a simulated network include, but are not limited to, including an identifying link of a node in a simulated user profile, including an identifying link of a simulated user profile in the instructions defining a node, assigning a simulated user profile to a node in the definitions and/or other computer-implementable instructions describing a simulated network, another mechanism of associating two data objects, and any combinations thereof.

With a simulated network having simulated user profiles associated with nodes, one or more items represented by item profiles in a simulated network can be shared and/or spread from one node (e.g., one simulated user profile) to one or more other nodes (e.g., one or more other simulated user profiles). The similarity of a simulated user profile to an item profile under consideration for possible sharing and/or spreading is utilized in simulating shares and/or spreads of that item profile.

Figure 8:
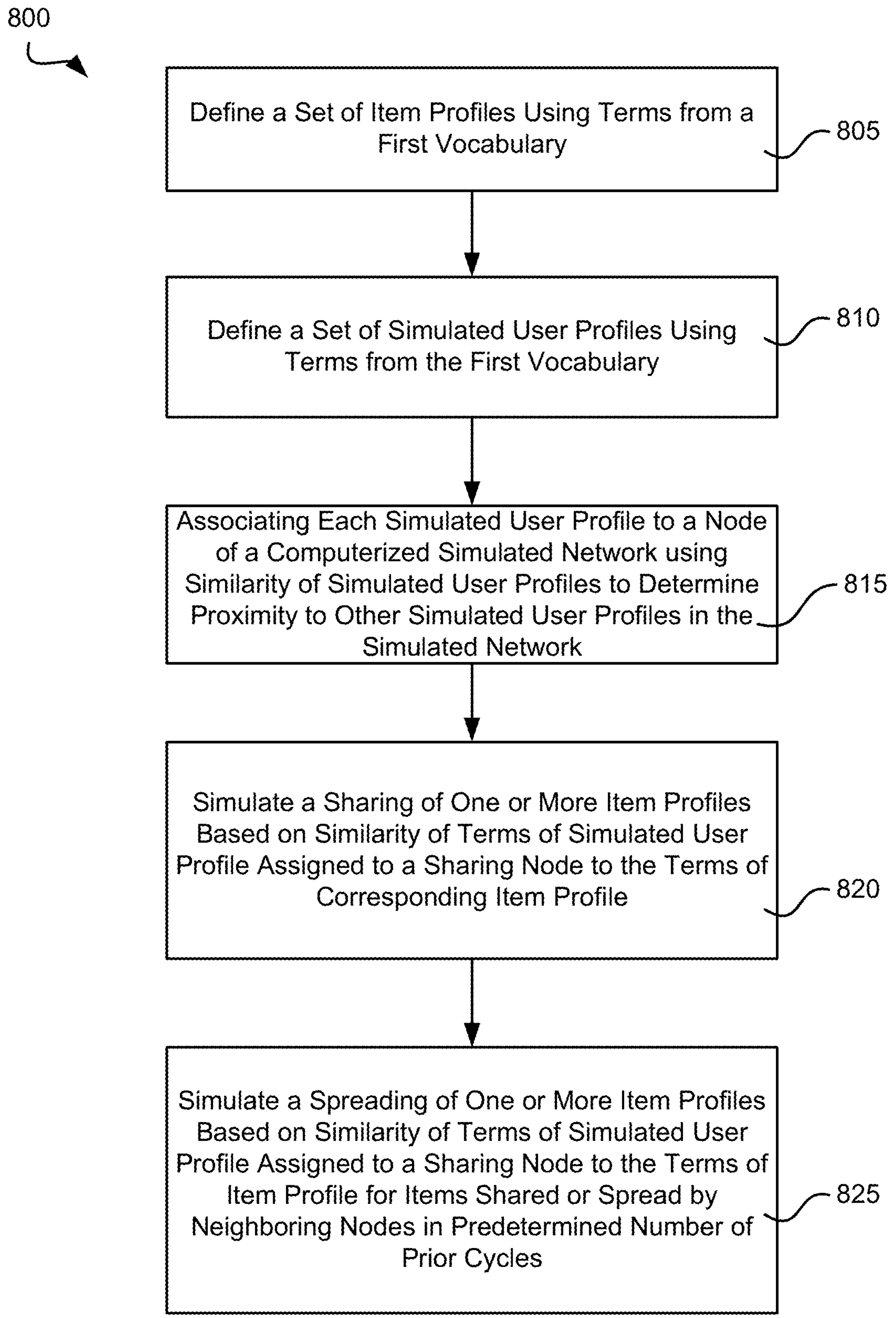
FIG. 8 illustrates one exemplary implementation of a method of generating and operating a simulated network.

FIG. 8 illustrates one exemplary implementation of a method 800 of generating and operating a simulated network. At step 805, a set of item profiles for the simulated network is defined using terms from a vocabulary. The vocabulary includes terms describing one or more characteristics and/or associated information for the items being represented by the set of item profiles. At step 810, a simulated user profile is defined for each user of a set of simulated users. The simulated user profile utilizes terms from the same vocabulary utilized in defining the item profiles. Implementation details, features, functionalities, and other characteristics of item profiles and simulated user profiles are discussed elsewhere herein and are applicable to this implementation and other examples and implementation herein where appropriate and where not stated otherwise.

Figure 9:
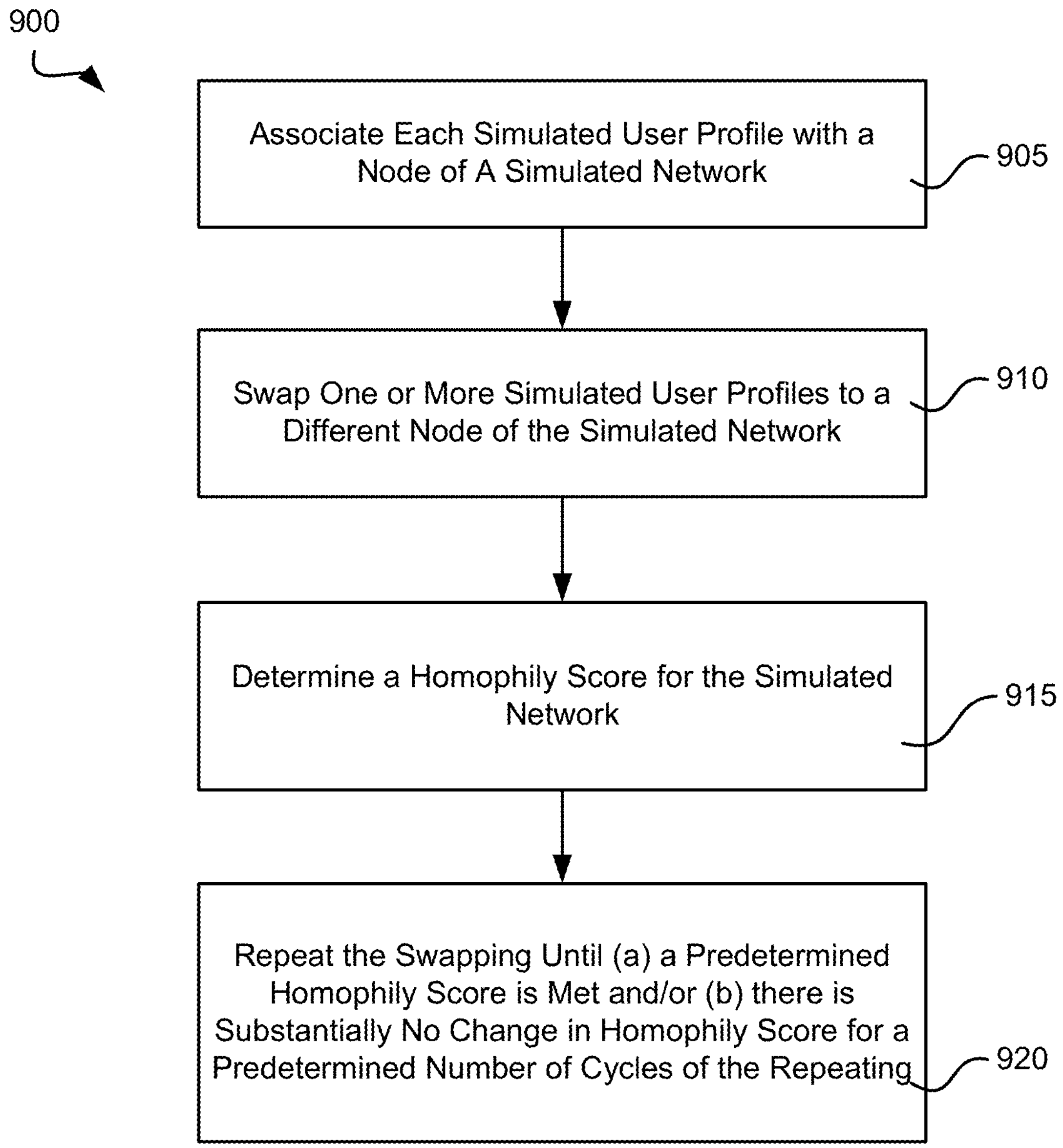
FIG. 9 illustrates one exemplary implementation of a method of associating a simulated user profile with a node of a simulated network.

At step 815, each simulated user profile is associated with a node of a computerized simulated network utilizing the similarity of the simulated user profile to other simulated user profiles being associated with nodes proximate the position of the node under consideration. Implementation details, features, functionalities, and other characteristics of associating simulated user profiles with nodes are discussed elsewhere herein and are applicable to this implementation and other implementation herein where appropriate and where not stated otherwise. FIG. 9 illustrates one exemplary implementation of a method 900 of associating a simulated user profile with a node of a simulated network. At step 905, each simulated user profile is associated with a node of a simulated network. At step 910, if the initial placement of simulated user profiles is not to a desired level of homophily, one or more of the associated simulated user profiles is swapped to have an association with another node and a new homophily score is determined at step 915. At step 920, the swapping of one or more simulated user profiles can be repeated until (a) a predetermined homophily score is achieved and/or (b) there is substantially no change in homophily score for a predetermined (e.g., 1, 2, 3, etc.) number of swapping cycles.

Referring again to FIG. 8, at step 820, the sharing of one or more item profiles is simulated based on a similarity of the terms of the simulated user profile associated with a given node (e.g., a "sharing node") to the terms of an item profile that is under consideration for possible sharing. A simulated sharing is a simulated introduction of an item profile to a portion of nodes of a simulated network. In one example, a simulated sharing includes sharing an item profile from one simulated user profile to the neighboring simulated user profiles in the simulated network. A simulated spreading (as discussed further below) is a simulated re-sharing by a simulated user profile of an item profile that had previously been shared and/or spread by one or more neighboring simulated user profiles. In one example, a simulated spreading includes a simulated user profile at a first node introducing an item profile shared in one of a predetermined number of prior cycles of simulation by a predetermined number of neighboring simulated user profiles to all of the other neighboring simulated user profiles of the first node. A simulated sharing and/or a simulated spreading may represent an action including, but not limited to, a tweet of an item, a sharing of an item, a liking of an item, and expression of an opinion of an item, a recommendation of an item, and any combinations thereof. Such an action may correspond to a similar action in a real-world network system and/or e-commerce system.

Simulating sharing may include a decision to not share one or more item profiles. Examples of not sharing an item profile include, but are not limited to, not sharing a given item profile, to not share a given item profile from a given simulated user profile, not sharing any item profiles from a given simulated user profile, and any combinations thereof. A decision of whether to share or which item profiles to share may include a variety of factors, including the similarity between the simulated user profile and the item profile. Example other factors for consideration in sharing an item profile include, but are not limited to, use of an external rank score for an item profile, use of a time delay factor or aging characteristic associated with an item profile, chance, and any combinations thereof.

An external rank score is a relative ranking of the all or a subset of the item profiles in a simulated network based on some external (i.e., outside the simulated network) factor. Example rank score factors include, but are not limited to, a number of times a real-world item corresponding to an item profile has been liked and/or commented upon by real-world users, a number of times a real-world item corresponding to an item profile has been purchased and/or viewed by real-world users, a sales ranking, a number of times a real-world item corresponding to an item profile has been downloaded by real-world users, a number of times a real-world item corresponding to an item profile has been connected to another item, and any combinations thereof. For example, 100 news articles each represented by item profiles in a simulated network may have corresponding data of how many times they were "liked" by users in a real-world online news service. This data can be utilized to create a relative ranking of the 100 news articles based on this specific rank to create ranks scores for each news article. In one example, news articles with higher rank scores may be treated with a higher probability for determining if an article (and/or which article) will be shared by a simulated user profile. Other types of items can similarly utilize a rank score.

A time delay factor (also referred to as an aging characteristic) is an adjustment to a sharing determination and/or a spreading determination based on the age of an item represented in an item profile of a simulated network. For example, item profiles can be each assigned a time delay factor that corresponds to a time since the item profile had been introduced in the simulated network (e.g., a time since previously shared or spread by another simulated user profile). In one such example, item profiles are organized into time groups (also referred to as time window) based on the time since sharing and/or spreading. In one example of time groupings, item profiles can be organized into groups that are within 1 hour old, between 1 hour and 2 hours old, between 2 hours and 4 hours old, between 4 hours and 12 hours old, and between 12 hours and 24 hours old. Time groupings do not require exclusivity of boundaries (i.e., the time groupings can overlap). In another example of time groupings, item profiles can be organized into groups that are within 1 hour old, between 0 hour and 2 hours old, between 0 hours and 4 hours old, between 0 hours and 12 hours old, and between 0 hours and 24 hours old. A time delay factor may include a probability characteristic for each time group. In one example, such a probability characteristic may be based on a randomly generated number and/or a number based on a relative probability consideration related to the time groupings. In one such example (e.g., the example above of 1, 2, 4, 12, and 24 hour groupings), time windows in a series may have a probability characteristic of 0.03, 0.04, 0.06, 0.04, and 0.02, respectively. One exemplary usage of a time delay factor can be to determine if any sharing or spreading will occur for a given time window for a given simulated user profile. In one such example, a randomly generated number is compared to the probability characteristic of a time delay factor for each time window to determine if any item profiles will be shared by the simulated user profile from that time window (e.g., if the random number generated is less than the probability characteristic there would be a sharing and/or spreading consideration).

For a simulated network having item profiles representing items from an e-commerce system, a time delay factor may be supplemented and/or replaced by a sales rank factor. A sales rank factor is a characteristic related to a relative ranking of an item with respect to other items based on volume of sales of the item in a real-world or simulated network or user system. For example, item profiles can be assigned a sales rank factor that represents a sales volume data and/or a relative ranking of an item amongst other items based on sales volume. Item profiles may then be grouped based on subsets of sales rank into sales rank windows. In one example, item profiles can be organized into sales rank windows such as those within the first 5,000 items in ranking, those from the 5,000 rank to the 10,000 rank, those from the 10,0000 rank to the 25,000 rank, etc. Sales rank windows may include overlap. In another example, item profiles can be organized into sales rank windows such as those within the first 5,000 items in ranking, those within the first 10,000 rank, those within the first 25,000 rank, etc. In implementation described herein where item profiles are described as being separated into groups by time windows, it is contemplated that the item profiles may also be grouped based on a sales rank window.

A simulation of sharing may include any number of cycles of sharing. A cycle of sharing may include looking at sharing from each simulated user profile in a simulated network and/or looking at sharing each item profile in a simulated network.

Figure 10:
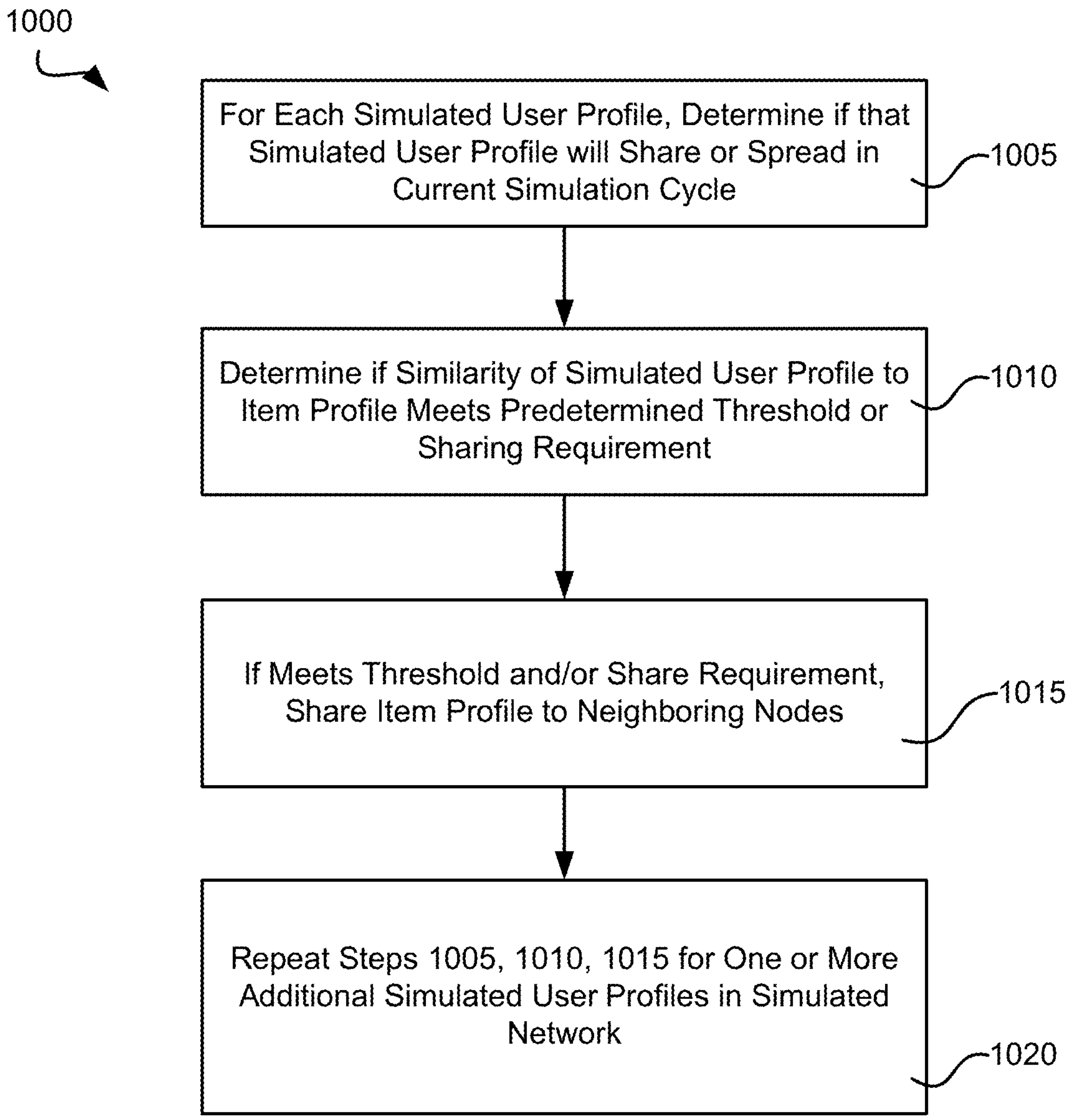
FIG. 10 illustrates one exemplary method for simulating a sharing of one or more item profiles in a simulated network.

FIG. 10 illustrates one exemplary method 1000 for simulating a sharing of one or more item profiles in a simulated network. At step 1005, for each simulated user profile, it is determined if that simulated user profile (positioned at a given node of the simulated network) will share or spread any item profile in a current cycle of simulation. For any given simulated user profile, a decision may be made to not share in that cycle. Example ways to determine if a simulated user profile will even consider to share in a cycle include, but are not limited to, a random determination to share or not to share, and any combinations thereof. In one example, a randomly generated number is created for each simulated user profile in a given cycle (e.g., a number between 0 and 1, such as for a simulated network using cosine similarity to make similarity determinations). In that example, the randomly generated number is compared to a predetermined threshold. Example ways of determining a threshold for a share/no share determination include, but are not limited to, a randomly generated threshold value, a threshold value determined by a relative probability of users sharing (e.g., related to total number of simulated user profiles and/or related to total number of item profiles eligible for sharing), and any combinations thereof.

At step 1010, for simulated user profiles that will be considered for sharing (i.e., a yes decision was made at step 1005, step 1005 was omitted and all simulated user profiles are considered for sharing, etc.), determine if similarity of simulated user profile to one or more item profiles meets a predetermined threshold or sharing requirement. Example ways to set a threshold or sharing requirement include, but are not limited to, using a randomly generated threshold criteria, using a criteria based on probabilities associated with item profiles under consideration, using a criteria based on a weighting factor associated with item profiles under consideration, and any combinations thereof. In one example, a randomly generated threshold criteria is determined for a given sharing comparison (e.g., a number from 0 to 1 in a cosine similarity determination). That criteria can be compared to the similarity of each item profile under consideration to the simulated user profile to determine if any of the item profiles match the criteria. In one such example, each item profile's relative similarity to the simulated user profile is determined (e.g., via totaling all of the similarity values for each item profile and dividing each by the total) and matched against the criteria.

At step 1015, if there is a meeting of the threshold and/or share requirement (e.g., a criteria value of 0.6 matching an item profile having a relative similarity value of 0.6), the matching item profile is shared by the simulated user profile to neighboring nodes. At step 1020, steps 1005, 1010, and 1015 are repeated for one or more additional simulated user profiles in the simulated network. In one example, the repeating is done for all simulated user profiles. In another example, the repeating is performed on a subset of all simulated user profiles.

Any number of item profiles can be considered for possible sharing by a given simulated user profile. In one example, all of the available item profiles in a simulated network are considered for possible sharing by a simulated user profile. In another example, a subset of all of the available item profiles in a simulated network are considered for possible sharing by a simulated user profile. In one such example, a first subset of item profiles is determined based on a predetermined number of the top ranked item profiles in a ranking order based on similarity between the simulated user profile and each item profile. In this same example, the first subset is further reduced by determining the item profiles that meet a predetermined level of similarity with the simulated user profile. This additional filtering ensures that there is a minimum desired level of similarity that may not be obtained only from taking the top number of ranked items (e.g., the distribution of high similarity values being small within the ranking). When a simulated sharing utilizes multiple time groups for item profiles, a reduction to a first subset and/or to a further filtered subset of the first subset may be performed on each time group. In one example of reducing the number of item profiles for consideration, 10,000 example item profiles in a simulated network (or in a time window) are reduced to 1,000 by taking the top 1,000 items from a ranking order based on similarity to the corresponding simulated user profile, and the 1,000 items are further reduced to 130 items by comparing the similarity of each item profile to the simulated user profile to select those item profiles meeting a predetermined minimum level of similarity.

Referring again to FIG. 8, at step 825, the spreading of one or more item profiles is simulated based on a similarity of the terms of the simulated user profile associated with a given node (e.g., the same "sharing node") to the terms of an item profile that was previously shared or spread by neighboring nodes within a predetermined number of prior cycles of simulation.

As with simulating sharing, simulating spreading may include a decision to not spread one or more item profiles. A decision of whether to consider the simulated user profile for spreading or which item profiles to spread may include a variety of factors, including the similarity between the simulated user profile and the item profile. Example other factors for consideration in spreading an item profile include, but are not limited to, use of an external rank score for an item profile, use of a time delay factor or aging characteristic associated with an item profile, average similarity of the simulated user profile under consideration for spreading to all of the neighboring simulated user profiles that had previously shared or spread the item profile, the number of neighboring simulated user profiles that had previously shared or spread the item profile, a random determination to consider spreading or not to spread, and any combinations thereof.

In one example, for a given simulated user profile, a determination to consider spreading or not to spread any item profiles by that simulated user profile in a given cycle can occur at the same time as the decision to consider sharing or not to share any item profiles by that same simulated user profile. In another example, a separate determination for whether or not to consider the simulated user profile for spreading may occur at a separate time.

Figure 11:
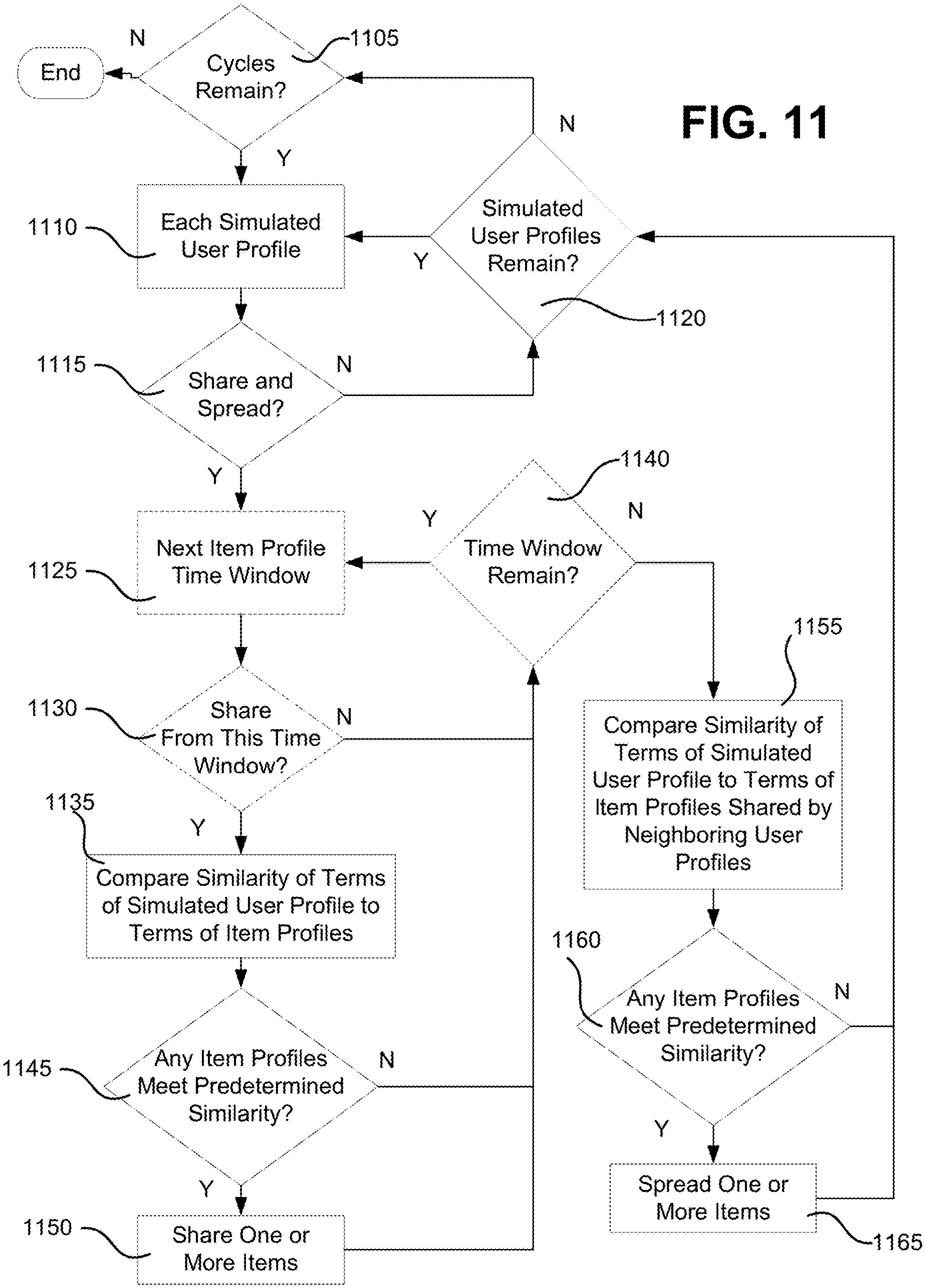
FIG. 11 illustrates another example implementation of a simulation of sharing and spreading using a simulated network of the current disclosure.

FIG. 11 illustrates another example implementation of a simulation of sharing and spreading using a simulated network of the current disclosure. Implementation details, features, functionalities, and other characteristics of item profiles, simulated user profiles, simulated sharing, simulated spreading, and other elements are discussed elsewhere herein and are applicable to this implementation and other examples and implementations herein where appropriate and where not stated otherwise.

At step 1105, upon an initial cycle of simulation of sharing and/or spreading, the method proceeds to step 1110. For subsequent cycles, as will be discussed further below, a determination is made at step 1105 if there are remaining cycles to the simulation. If the determination is yes, the method proceeds to step 1110. If the determination is no, the method ends.

At step 1110, for each simulated user profile of the simulated network (e.g., as associated with nodes as discussed above), a determination is made at step 1115 of whether or not the simulated user profile will consider possibly sharing and/or spreading one or more item profiles from that simulated user to neighboring simulated users. In one example, an implementation of a simulated network is configured to always consider sharing and/or spreading at step 1115 such that this step is essentially a non-action step. In another example, an implementation of a simulated network includes an active step of determining if each simulated user profile will continue with a consideration of whether or not to spread and/or share at step 1115. In one example of determining, a random number is generated and compared against one or more predetermined values for step 1115. In one such example, a number from 0 to 1 is randomly generated and compared against a predetermined value (e.g., a probability value, such as one based on a relative probability of item profiles to be selected and/or a relative probability related to the number of simulated user profiles). For example, a random number is generated (e.g., 0.02) and compared against a predetermined value of 1/300. If the randomly generated number is below (in this example) the predetermined value, the decision to proceed to consider possible sharing and/or spreading is positive. Other examples of techniques for determining are discussed above.

If a determination at step 1115 is no, the method proceeds to step 1120. At step 1120, if additional simulated user profiles exist in the simulated network to run through the current cycle of simulation, the method proceeds back to step 1110. If no further simulated user profiles need to be considered in the current cycle, the method proceeds back to step 1105. If a determination at step 1115 is yes, the method proceeds to step 1125.

Steps 1125, 1130, and 1140 are optional steps utilized in a simulation of sharing and/or spreading in which item profiles are organized into time windows. If no such organization is configured, the method can proceed to step 1135. If time window configuration exists for the simulation, at step 1125, for each item profile time window a further optional step 1130 of a threshold determination whether to consider the time window for possible sharing by the simulated user profile is made. In one example of threshold determination for each time window, a random number is generated and compared against a predetermined value to decide if the simulated user profile will consider any item profiles from that time window. Examples of such determination are discussed above. If the determination is positive (e.g., the randomly selected number meets the requirement of the predetermined number, such as by being greater than or less than the predetermined number as is appropriate in the given case), the method proceeds to step 1135. If the result is negative, the method proceeds to step 1140 where a determination is made if there are any additional time windows to be considered in the current cycle for the current simulated user profile. If so, the method proceeds back to step 1125. If not, the method proceeds to step 1155, which will be discussed further below.

At step 1135, the terms of the simulated user profile are compared to the terms of item profiles available for consideration. If using a time window configuration, the item profiles available for consideration would be those in the current time window under consideration. Example additional reductions in the number of item profiles to be considered are discussed above. At step 1145, if the comparison of similarity meets a predetermined level of similarity, the process proceeds to step 1150 and the one or more item profiles that met the similarity standard are shared to neighboring simulated user profiles. The process proceeds to step 1140. Example ways of determining a predetermined level of similarity are discussed above. Another exemplary implementation is discussed below with respect to FIG. 12. If no item profiles match the similarity requirements at step 1145, the process proceeds to step 1140. Again, at step 1140, if the simulation is configured with time windows and additional time windows exist for consideration in the current cycle, the simulation proceeds to step 1125. At step 1140, if there are no additional time windows for consideration, the process proceeds to step 1155. if the simulation is not configured with time windows, the process proceeds from either step 1145 or 1150 to step 1155.

At step 1155, each of the item profiles that had been previously shared by a neighboring simulated user profile are compared for similarity to the simulated user profile currently being considered. In an optional variation, only those item profiles that had been shared by a predetermined number of neighboring simulated user profiles and/or had been shared within a predetermined number of prior cycles are considered at step 1155 for similarity to the current simulated user profile. Any item profiles that meet predetermined requirements of similarity comparison at step 1160 are spread to neighboring simulated user profiles at step 1165 from the current simulated user profile. Then the simulation proceeds to step 1120. If no item profiles meet predetermined requirements at step 1160, the simulation proceeds to step 1120. Examples of implementation details for determining if an item profile will be spread are discussed above and also below with respect to FIG. 13.

Figure 12:
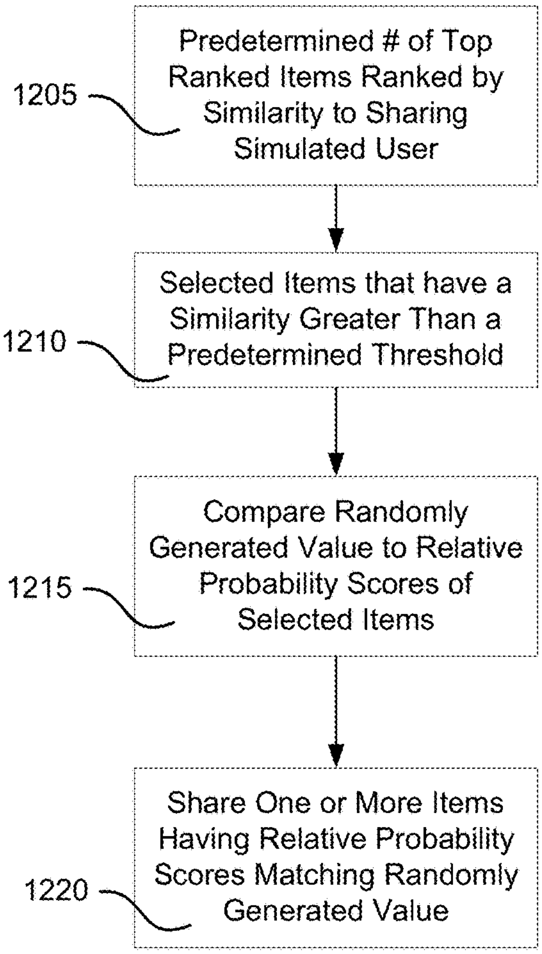
FIG. 12 illustrates one exemplary method of determining item profiles to share in a simulated sharing in a simulated network of the current disclosure.

FIG. 12 illustrates one exemplary method of determining item profiles to share in a simulated sharing in a simulated network of the current disclosure. At step 1205, a predetermined number of top ranked item profiles that are ranked by similarity to a current simulated user profile are selected as a subset to all item profiles. For example, the top 300 ranked item profiles can be selected from such a ranking. This reduction may increase the likelihood of similarity between the item profiles and the simulated user profile. At step 1210, the subset of item profiles from step 1205 is further reduced by selecting the item profiles that have a similarity with the simulated user profile that exceeds a predetermined similarity value threshold. At step 1215, a randomly generated value is compared to a relative similarity value for each of the selected item profiles from step 1210, the similarity value based on the similarity of the corresponding item profile to the current simulated user profile. To determine the relative similarity value, the similarity values for all of the item profiles under consideration at step 1215 are summed and each similarity value is divided by the sum. At step 1220, one or more item profiles that have a matching relative similarity value to the randomly generated value are shared to neighboring simulated user profiles. Matching values may be any predetermined degree of matching that satisfies a desired level of sharing for the simulated network. For example, a match may be an exact numerical match, a statistically relevant match (e.g., within plus or minus boundaries), a substantial match (e.g., using significant figures), or other type of predetermined match degree for the two numbers.

Figure 13:
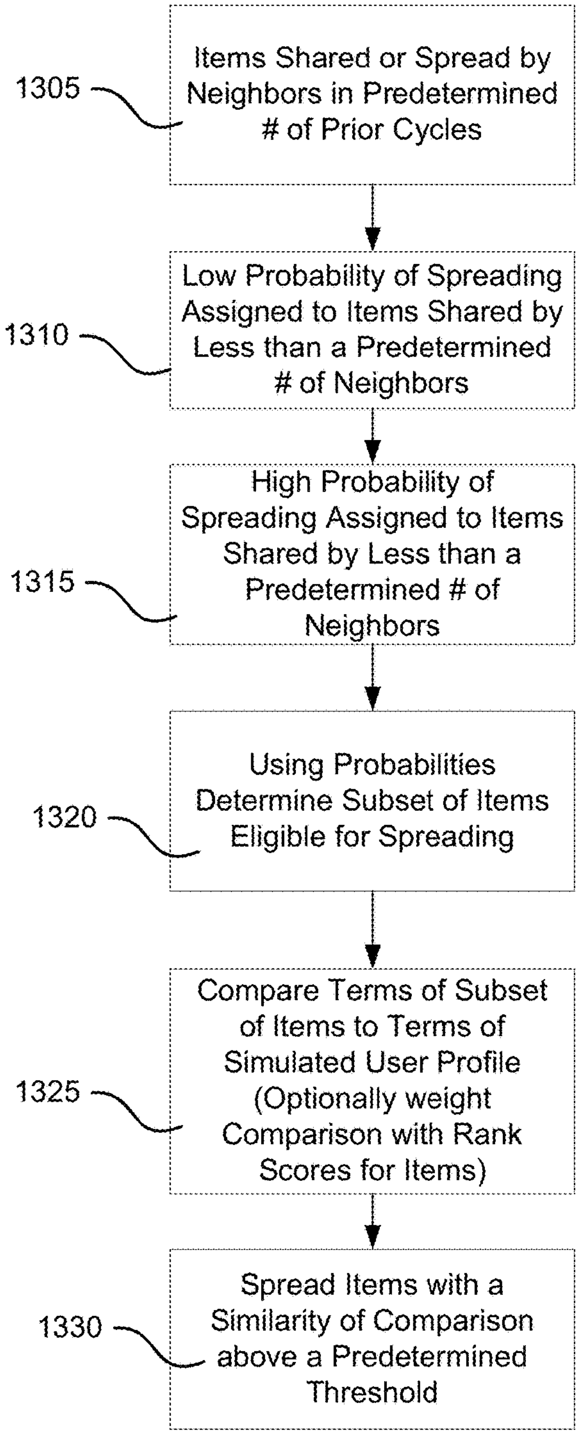
FIG. 13 illustrates one exemplary method of determining item profiles to spread in a simulated spreading in a simulated network of the current disclosure.

FIG. 13 illustrates one exemplary method of determining item profiles to spread in a simulated spreading in a simulated network of the current disclosure. At step 1305 item profiles that had been shared within a predetermined number of prior cycles by neighbors to the current simulated user profile are considered. At step 1310, a low probability of spreading an item is assigned to item profiles shared by less than a predetermined number of neighbors. At step 1315, a relatively high probability of spreading an item is assigned to item profiles shared by more than the predetermined number of neighbors. At step 1320, the probabilities from steps 1310 and 1315 are utilized to determine a subset of items eligible for spreading. At step 1325, the item profiles of the subset of item profiles are compared for similarity to the simulated user profile. Optionally, the similarity comparison may utilize a rank score for item profiles to weight one or more aspects of an item profile in a similarity comparison. At step 1330, item profiles with a similarity comparison that meets a predetermined threshold are spread to neighboring simulated user profiles. In one example, the predetermined threshold is a manually determined value. In another example, the predetermined threshold is a randomly determined value.

Figure 14:
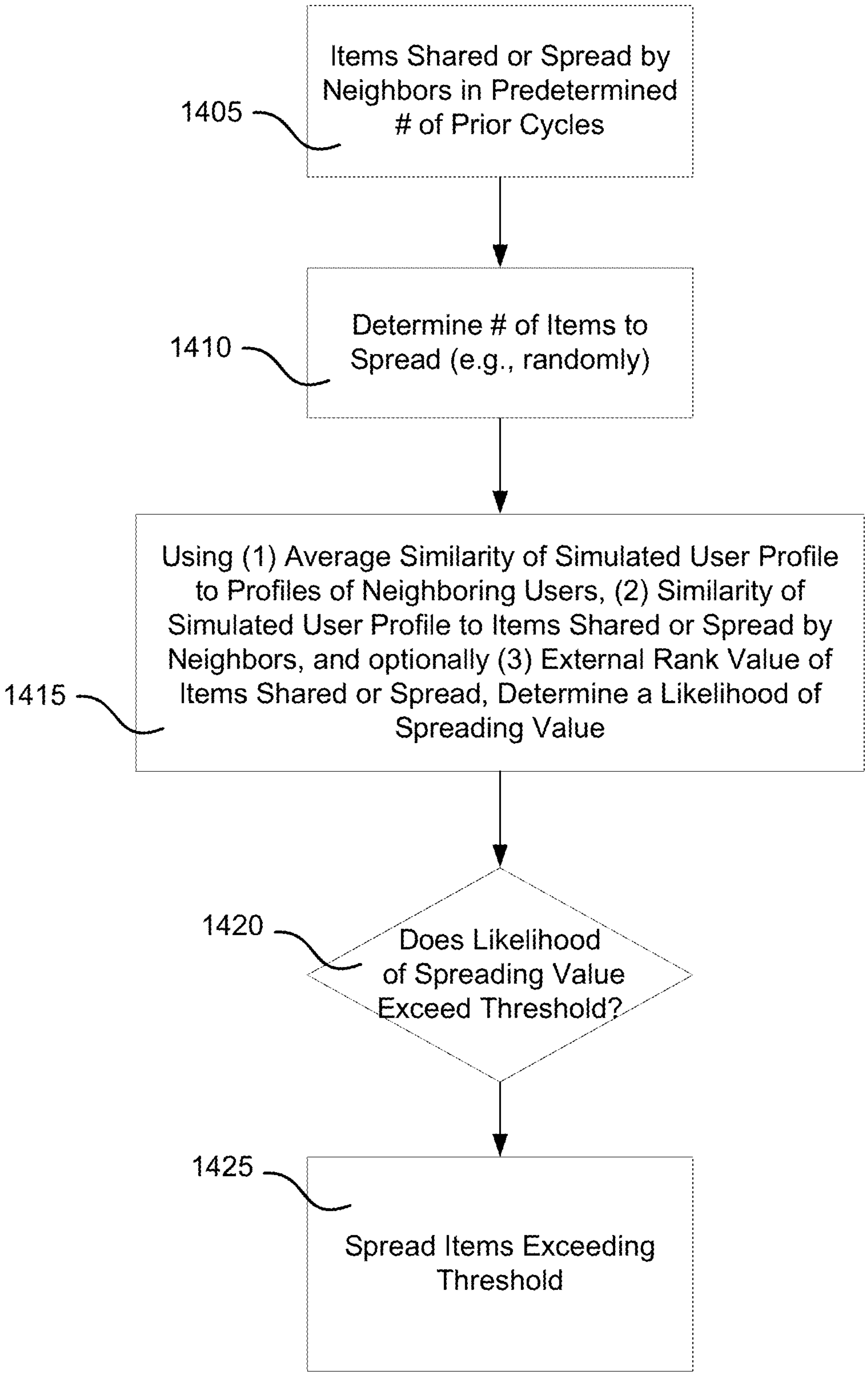
FIG. 14 illustrates another exemplary method of determining item profiles to spread in a simulated spreading in a simulated network of the current disclosure.

FIG. 14 illustrates another exemplary method of determining item profiles to spread in a simulated spreading in a simulated network of the current disclosure. At step 1405, item profiles that had been shared within a predetermined number of prior cycles by neighbors to the current simulated user profile are considered. At step 1410, a number of items to spread is optionally determined (e.g., using a random generation of a number and/or a probabilistic value). Optionally, the number of neighbors that shared a particular item profile can be utilized to remove from consideration any item profiles not meeting a minimum desired number of prior shares. At step 1415, a likelihood of spreading value is determined utilizing (1) the average similarity of the current simulated user profile to profiles of neighboring users, (2) similarity of the current simulated user profile to the item profiles for items shared or spread by neighbors within a predetermined number of prior cycles, and optionally (3) an external rank value for the item profiles being considered. At step 1420, the likelihood of spreading value is compared to a predetermined threshold value (e.g., a randomly generated value (e.g., from 0 to 1 for cosine similarity examples)) to see if the likelihood of spreading value exceeds the predetermined threshold. If so, at step 1425, the item profiles that exceed the threshold are spread to neighboring simulated user profiles. In one example, a likelihood of spreading value includes use of a logistic function defined by the equation:

var $p$=($f$(score)*$px$*user2article)/(1+$e$^−1*(closeNeighbors−(3))), wherein closeNeighbors is the number of neighbors who shared the same item that have a similarity above a predetermined minimum threshold; (3) is the threshold number of neighbor users for the logistic curve; f(score) is some function of score that increases likelihood of spreading according to overall score for item profile (e.g., a rank score as described above); px is the average similarity of neighbors who shared the item profile; and user2article is the similarity value of the simulated user profile to the item profile.

Figure 15:
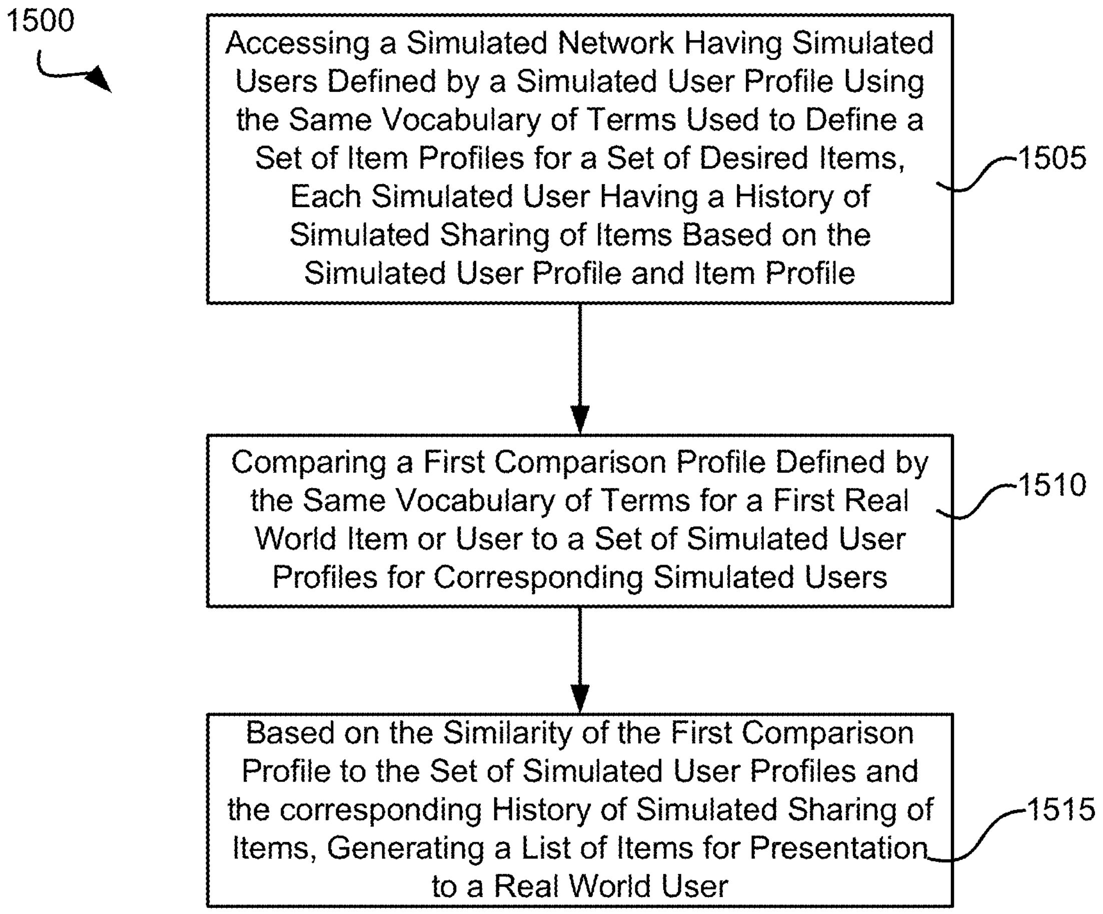
FIG. 15 illustrates one exemplary method of integrating information from a simulated network of the current disclosure with a real-world e-commerce or other user network system.

FIG. 15 illustrates one exemplary method 1500 of integrating information from a simulated network of the current disclosure with a real-world e-commerce or other user network system. At step 1505 a simulated network is accessed. The simulated network has simulated user profiles and item profiles that have terms based on the same vocabulary. The simulated user profiles (and the corresponding simulated users) each have a history of simulated sharing of items based on the similarity of the simulated user profile and the item profiles. At step 1510, a comparison profile for a real-world user and/or a real-world item from a real-world user network system and/or e-commerce system is compared to one of more simulated user profiles of the simulated network. The comparison profile includes the terms selected from the same vocabulary of terms used for the simulated user profiles and the simulated item profiles. At step 1515, based on a similarity of the comparison profile to one or more simulated user profiles and the corresponding history for those simulated user profiles, a list of items or other information is generated for presentation to the real-world user.

Figure 16:
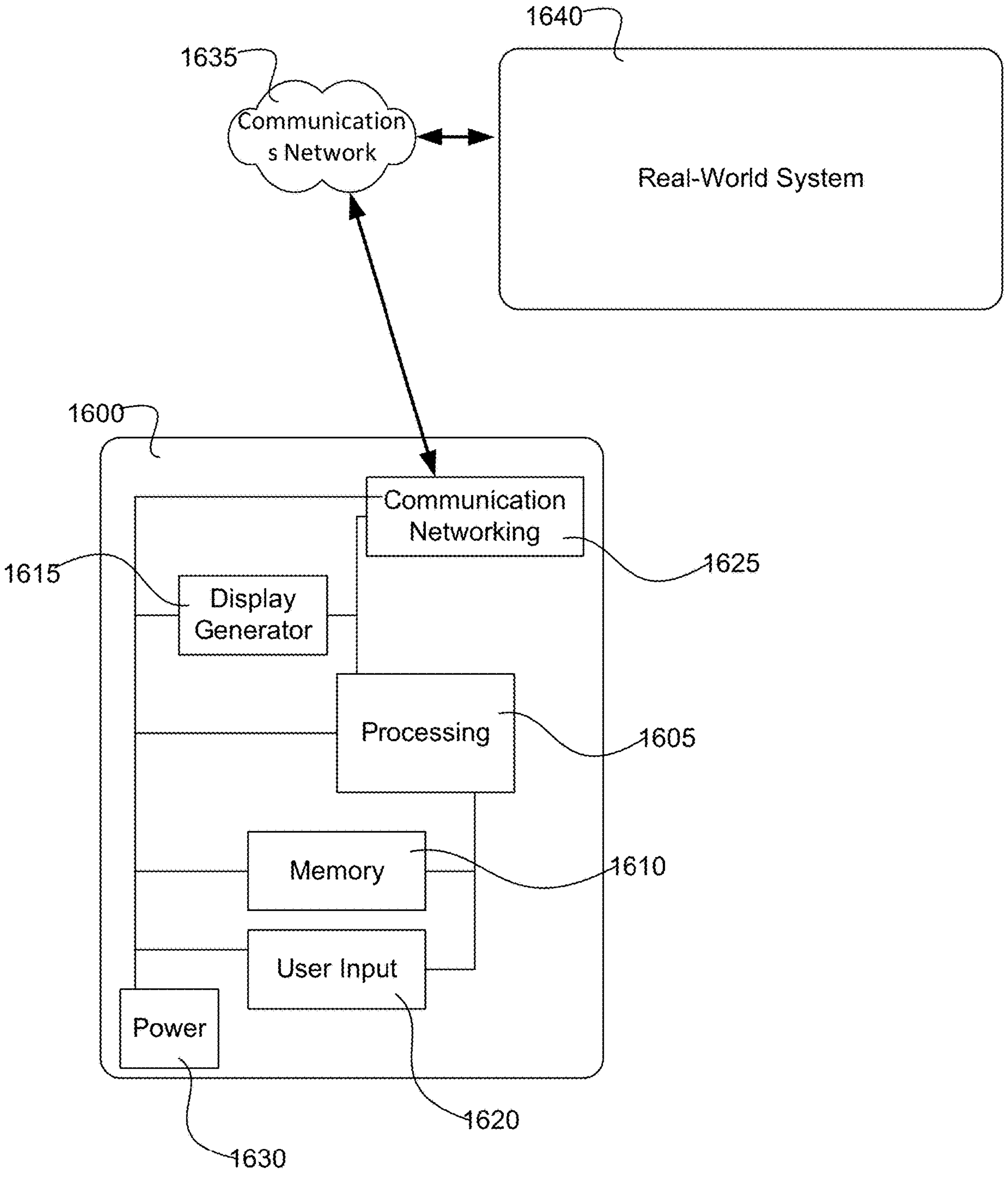
FIG. 16 illustrates one example diagrammatic representation of one implementation of a simulated network system.

FIG. 16 illustrates one example diagrammatic representation of one implementation of a simulated network system 1600. Simulated network system 1600 includes a processing element 1605, a memory 1610, a display generator 1615, a user input 1620, a communication networking element 1625, and a power supply 1630. Processing element 1605 includes circuitry and/or machine-executable instructions (e.g., in the form of firmware stored within a memory element included with and/or associated with processing element 1605) for executing instructions for completing one or more tasks (e.g., tasks associated with one or more of the implementations, methodologies, features, aspects, and/or examples described herein). Examples of a processing element include, but are not limited to, a microprocessor, a microcontroller, one or more circuit elements capable of executing a machine-executable instruction, and any combinations thereof.

Memory 1610 may be any device capable of storing data (e.g., data representing a simulated user profile, a term vocabulary, an item profile, a comparison profile, one or more predetermined values (e.g., a predetermined threshold value), etc.), machine-executable instructions, and/or other information related to one or more of the implementations, methodologies, features, aspects, and/or examples described herein. A memory, such as memory 1610, may include a machine-readable hardware storage medium. Examples of a memory include, but are not limited to, a solid state memory, a flash memory, a random access memory (e.g., a static RAM “SRAM”, a dynamic RAM “DRAM”, etc.), a magnetic memory (e.g., a hard disk, a tape, a floppy disk, etc.), an optical memory (e.g., a compact disc (CD), a digital video disc (DVD), a Blu-ray disc (BD); a readable, writeable, and/or re-writable disc, etc.), a read only memory (ROM), a programmable read-only memory (PROM), a field programmable read-only memory (FPROM), a one-time programmable non-volatile memory (OTP NVM), an erasable programmable read-only memory (EPROM), an electrically erasable programmable read-only memory (EEPROM), and any combinations thereof. Examples of a flash memory include, but are not limited to, a memory card (e.g., a MultiMediaCard (MMC), a secure digital (SD), a compact flash (CF), etc.), a USB flash drive, another flash memory, and any combinations thereof.

A memory may be removable from device 1600. A memory, such as memory 1610, may include and/or be associated with a memory access device. For example, a memory may include a medium for storage and an access device including one or more circuitry and/or other components for reading from and/or writing to the medium. In one such example, a memory includes a disc drive for reading an optical disc. In another example, a computing device may include a port (e.g., a Universal Serial Bus (USB) port) for accepting a memory component (e.g., a removable flash USB memory device).

A memory, such as memory 1610, may include any information stored thereon. Examples of information that may be stored via a memory associated with a computing device include, but are not limited to, a simulated user profile, a term vocabulary, an item profile, a comparison profile, one or more predetermined values (e.g., a predetermined threshold value), machine-executable instructions embodying any one or more of the aspects and/or methodologies of the present disclosure (e.g., instructions for simulating sharing and/or spreading of a item profile, instructions for providing an information regarding one or more items to a real-world user, etc.), an operating system for a computing device, an application program a program module, program data, a basic input/output system (BIOS) including basic routines that help to transfer information between Display component 1620 is connected to processing element 1605 for providing a display according to any one or more of the implementations, examples, aspects, etc. of the current disclosure (e.g., providing a presentation of information from a simulated network related to sharing and/or spreading of simulated items and to a real-world user or item from a real-world e-commerce system and/or other user network system). A display component 1615 may include a display element, a driver circuitry, display adapter, a display generator, machine-executable instructions stored in a memory for execution by a processing element for displaying still and/or moving images on a screen, and/or other circuitry for generating one or more displayable images for display via a display element. Example display elements are discussed above. In one example, a display element is integrated with device 1600 (e.g., a built-in LCD touch screen). In another example, a display element is associated with device 1600 in a different fashion (e.g., an external LCD panel connected via a display adapter of display component 1615).

User input 1620 is configured to allow a user to input one or more commands, instructions, and/or other information to simulated network system 1600. For example, user input 1620 is connected to processing element 1605 (and optionally to other components directly or indirectly via processing element 1605) to allow a user to interface with simulated network system 1600. Examples of a user input include, but are not limited to, a keyboard, a keypad, a screen displayable input (e.g., a screen displayable keyboard), a button, a toggle, a microphone (e.g., for receiving audio instructions), a pointing device, a joystick, a gamepad, a cursor control device (e.g., a mouse), a touchpad, an optical scanner, a video/image capture device (e.g., a camera), a touch screen of a display element, a pen device (e.g., a pen that interacts with a touch screen and/or a touchpad), and any combination thereof. It is also contemplated that one or more commands, data, and/or other information may be input to a computing device via a data transfer over a network and/or via a memory device (e.g., a removable memory device). A user input, such as user input 1620, may be connected to simulated network system 1600 via an external connector (e.g., an interface port).

Communication networking element 1625 includes circuitry and/or machine-executable instructions (e.g., in the form of firmware stored within a memory element included with and/or associated with interface element 1625) for communicating with one or more additional computing devices and/or connecting an external device to simulated network system 1600. An external interface/communication networking element, such as element 1625, may include one or more external ports. In another example, an external interface element includes an antenna element for assisting with wireless communication. Examples of an external interface element include, but are not limited to, a network adapter, a Small Computer System Interface (SCSI), an advanced technology attachment interface (ATA), a serial ATA interface (SATA), an Industry Standard Architecture (ISA) interface, an extended ISA interface, a Peripheral Component Interface (PCI), a Universal Serial Bus (USB), an IEEE 1394 interface (FIREWIRE), and any combinations thereof. A network adapter includes circuitry and/or machine-executable instructions configured to connect a computing device, such as simulated network system 1600, to a communication network.

A communication network is a way for connecting two or more computing devices to each other for communicating information (e.g., data, machine-executable instructions, image files, video files, electronic messages, etc.). Examples of a communication network include, but are not limited to, a wide area network (e.g., the Internet, an enterprise network), a local area network (e.g., a network associated with an office, a building, a campus or other relatively small geographic space), a short distance network connection, a telephone network, a data network associated with a telephone/voice provider (e.g., a mobile communications provider data and/or voice network), another data network, a direct connection between two computing devices (e.g., a peer-to-peer connection), a proprietary service-provider network (e.g., a cable provider network), a wired connection, a wireless connection (e.g., a Bluetooth connection, a Wireless Fidelity (Wi-Fi) connection (such as an IEEE 802.11 connection), a Worldwide Interoperability for Microwave Access connection (WiMAX) (such as an IEEE 802.16 connection), a Global System for Mobile Communications connection (GSM), a Personal Communications Service (PCS) connection, a Code Division Multiplex Access connection (CDMA), and any combinations thereof. A network may employ one or more wired, one or more wireless, and/or one or more other modes of communication. A communication network may include any number of communication network segment types and/or network segments.

Power supply 1630 is shown connected to other components of simulated network system 1600 to provide power for operation of each component. Examples of a power supply include, but are not limited to, an internal power supply, an external power supply, a battery, a fuel cell, a connection to an alternating current power supply (e.g., a wall outlet, a power adapter, etc.), a connection to a direct current power supply (e.g., a wall outlet, a power adapter, etc.), and any combinations thereof.

Components of device 1600 (processing element 1605, memory 1610, display component 1615, user input 1620, interface element 1625, power supply 1630) are shown as single components. A computing device may include multiple components of the same type. A function of any one component may be performed by any number of the same components and/or in conjunction with another component. For example, it is contemplated that the functionality of any two or more of processing element 1605, memory 1610, display component 1615, user input 1620, interface element 1625, power supply 1630, and another component of a computing device or portion of simulated network system may be combined in an integrated circuit. In one such example, a processor (e.g., processing element 1605) may include a memory for storing one or more machine executable instructions for performing one or more aspects and/or methodologies of the present disclosure. Functionality of any one or more components may also be distributed across multiple computing devices. Such distribution may be in different geographic locations (e.g., connected via a network). Components of system 1600 are shown as internal components to device 1600. A component of a simulated network system, such as system 1600, may be associated with the system in a way other than by being internally connected.

Components of simulated network system 1600 are shown connected to other components. Examples of ways to connect components of a system include, but are not limited to, a bus, a component connection interface, another type of connection, and/or any combinations thereof. Examples of a bus and/or component connection interface include, but are not limited to, a memory bus, a memory controller, a peripheral bus, a local bus, a parallel bus, a serial bus, a SCSI interface, an ATA interface, an SATA interface, an ISA interface, a PCI interface, a USB interface, a FIREWIRE interface, and any combinations thereof. Various bus architectures are known. Select connections and components in device 1600 are shown. For clarity, other connections and various other well-known components (e.g., an audio speaker, a printer, have been omitted and may be included in a computing device. Additionally, a simulated network system may omit in certain implementations one or more of the shown components. It is understood that simulated network system 1600 may include components of a computing device. However, if so, it is noted that the computer executable instructions and data associated with one or more of the implementations, methodologies, features, aspects, and/or examples described herein interact with the processing element and memory in a way to create a specialized system for simulating a network as described herein and interfacing with a real-world e-commerce system and/or other real-world user network system, such as a social network.

FIG. 16 shows simulated network system 1600 connected via communication networking element 1625 and communication network 1635 to a real-world system (e.g., an e-commerce system, a social network, other user network system, etc.) 1640. This connection, for example, can provide integration of information from a simulated network on system 1600 with information from real-world system 1640. A user of real-world system 1640 may connect to real-world system 1640 via a separate computing device, via an interface provided by system 1600, or via another connection.

Figure 17:
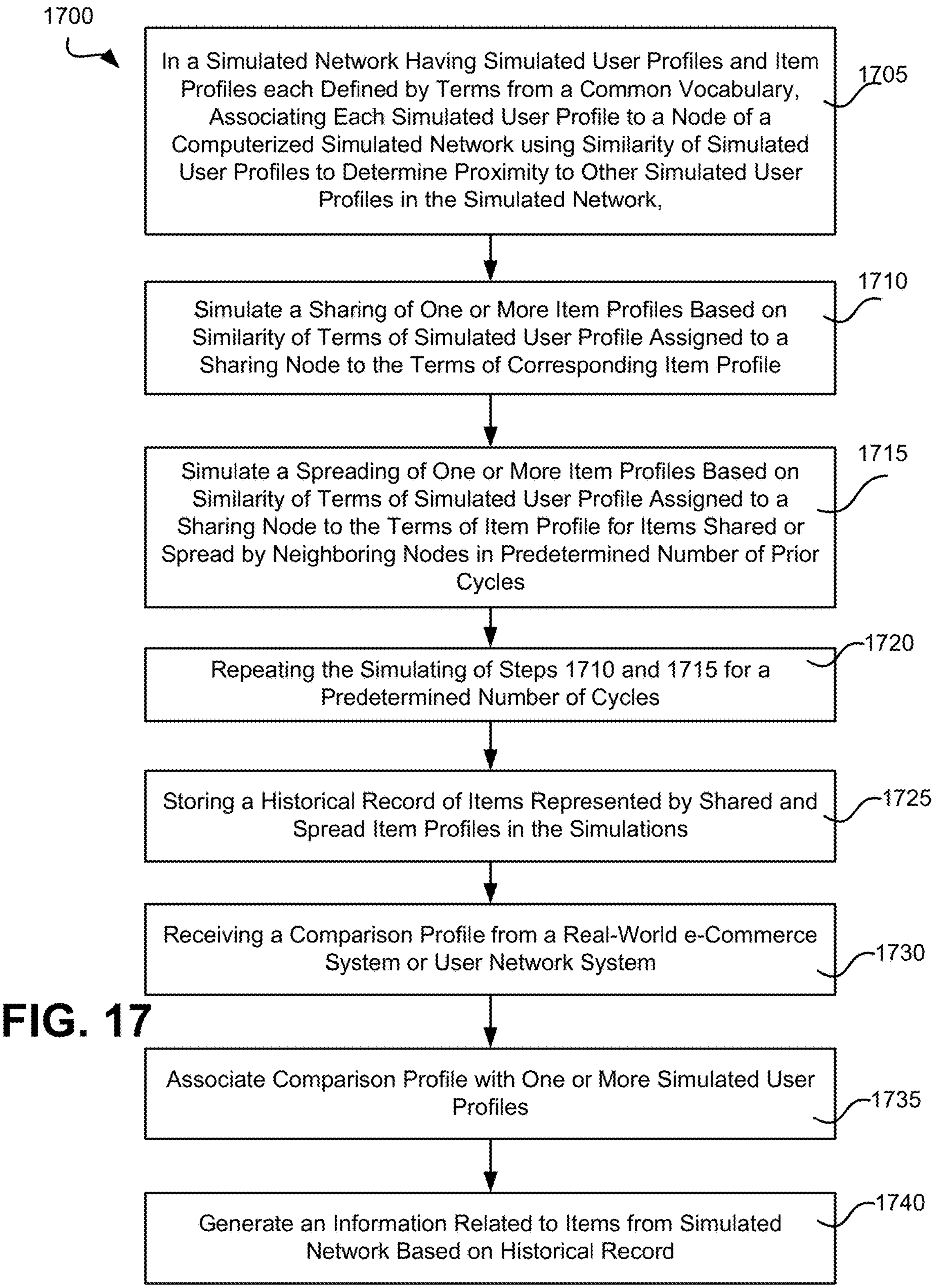
FIG. 17 illustrates one exemplary implementation of a method of generating a simulated listing of information related to sharing and/or spreading of items via a simulated network for presentation to a real-world computer-based e-commerce system or other real-world user network system.

FIG. 17 illustrates one exemplary implementation of a method of generating a simulated listing of information related to sharing and/or spreading of items via a simulated network for presentation to a real-world computer-based e-commerce system or other real-world user network system. At step 1705, in a simulated network having simulated user profiles and item profiles each defined by terms from a common vocabulary of terms, each simulated user profile is associated with a node of a computerized simulated network using a similarity value/score of the simulated user profile to other simulated user profiles positioned in the simulated network to determine proximity of the simulated user profile to the other simulated user profiles. Examples and implementation detail variations are discussed above for associating a user profile to a node. For example, details, concepts, aspects, features, characteristics, examples, and/or alternatives of a component/element discussed above with respect to an implementation, embodiment, and/or methodology (e.g., those discussed with respect to methods of FIGS. 8 to 15), may be applicable to a like component and/or methodology in another implementation, embodiment, and/or methodology discussed here with respect to FIG. 17, even though for the sake of brevity it may be repeated.

At step 1710, a sharing of one or more item profiles is simulated based on a similarity of terms of a simulated user profile with terms of a corresponding item profile. At step 1715, a spreading of one or more item profiles is simulated based on similarity of terms of a simulated user profile to the terms of a corresponding item profile previously shared by one or more neighboring nodes within a predetermined number of prior cycles. At step 1720, simulation of steps 1710 and 1715 is repeated for a predetermined number of cycles. It is contemplated that any number of cycles may be utilized. In one example, a predetermined number of cycles is large enough that the repeating of step 1720 is continuous until stopped by a user.

At step 1725 a historical record of information related to item represented by item profiles shared and/or spread in the simulation is stored (e.g., in a memory of a simulated network). A historical record can be an ongoing record that is updated as additional simulations occur and/or are ongoing.

At step 1730, a comparison profile is received at the simulated network from a real-world e-commerce system and/or another user network system. The comparison profile represents a real item or a real user associated with the real-world system and has terms based on one or more of its characteristics, the terms from the same vocabulary used for the simulated user profile and simulated item profiles.

At step 1735, the comparison profile is associated with one or more simulated user profiles of the simulated network. The association can occur in a variety of ways. In one example, the comparison profile is compared (e.g., via a processor of the simulated network) to existing simulated user profiles to determine a set of simulated user profiles that are matched by similarity (e.g., comparison of terms of the comparison profile to the simulated user profiles) to a desired level of similarity. In another example, a new simulated user profile can be modeled after the comparison profile. The new simulated user profile and/or the comparison profile itself can then be associated with a node of the simulated network (e.g., with a proximity based on similarity of the new simulated user profile/comparison profile to other simulated user profiles in the proximity of the node). For example, the degree of similarity to other nodes can be controlled (e.g., optimized and/or maximized) by proximity placement of a simulated user profile at a particular node. The set of one or more simulated user profiles that is associated with the comparison profile may be referred to as comparison simulated user profiles.

At step 1740, a list of information is generated related to items that are shared and/or spread by the set of one or more comparison simulated user profiles (e.g., using the corresponding historical record). For example, information about items shared and/or spread may have a connection (e.g., theoretically based on the similarity comparisons made to associate the comparison profile) to the real-world user or item. Example lists of information that can be generated and/or presented to a real world user include, but are not limited to, a recommendation of an item (e.g., for purchase, viewing, or other interest of the user), a display of terms based on a level of similarity of terms to a comparison profile and/or based on a level of probability of occurrence, a news feed of items shared and/or spread by simulated user profiles in the simulated network (e.g., those simulated user profiles proximate an association of a comparison profile), other information related to the items shared and/or spread in a simulated network, and any combinations thereof.

Figure 18:
FIG. 18 illustrates one exemplary implementation of a display of an example list of terms from top topics in a vocabulary of a simulated network.

Information provided regarding the operation of one or more simulated sharing and/or spreading operations can occur via a variety of ways. Example ways of providing information to a real-world user include, but are not limited to, providing a graphical user interface via a display associated with a real-world e-commerce or other real world system, providing a graphical user interface via a display associated with a computing device connected to a real-world e-commerce or other real-world system, providing the information via a communication network from the simulated network system to a real-world e-commerce or other real-world system, embedding information in an electronic communication (e.g., an email or other messaging protocol), embedding the information in a website display associated with a real-world e-commerce or other real world system, providing a running list of items shared and/or spread by simulated users, and any combinations thereof. FIG. 18 illustrates one exemplary implementation of a display of an example list of terms from top topics in a vocabulary of a simulated network. In the display, terms with higher occurrences (e.g., in item profiles, in item profiles being shares and/or spread, etc.) are displayed with a larger size than terms with lower occurrences.

Figure 19:
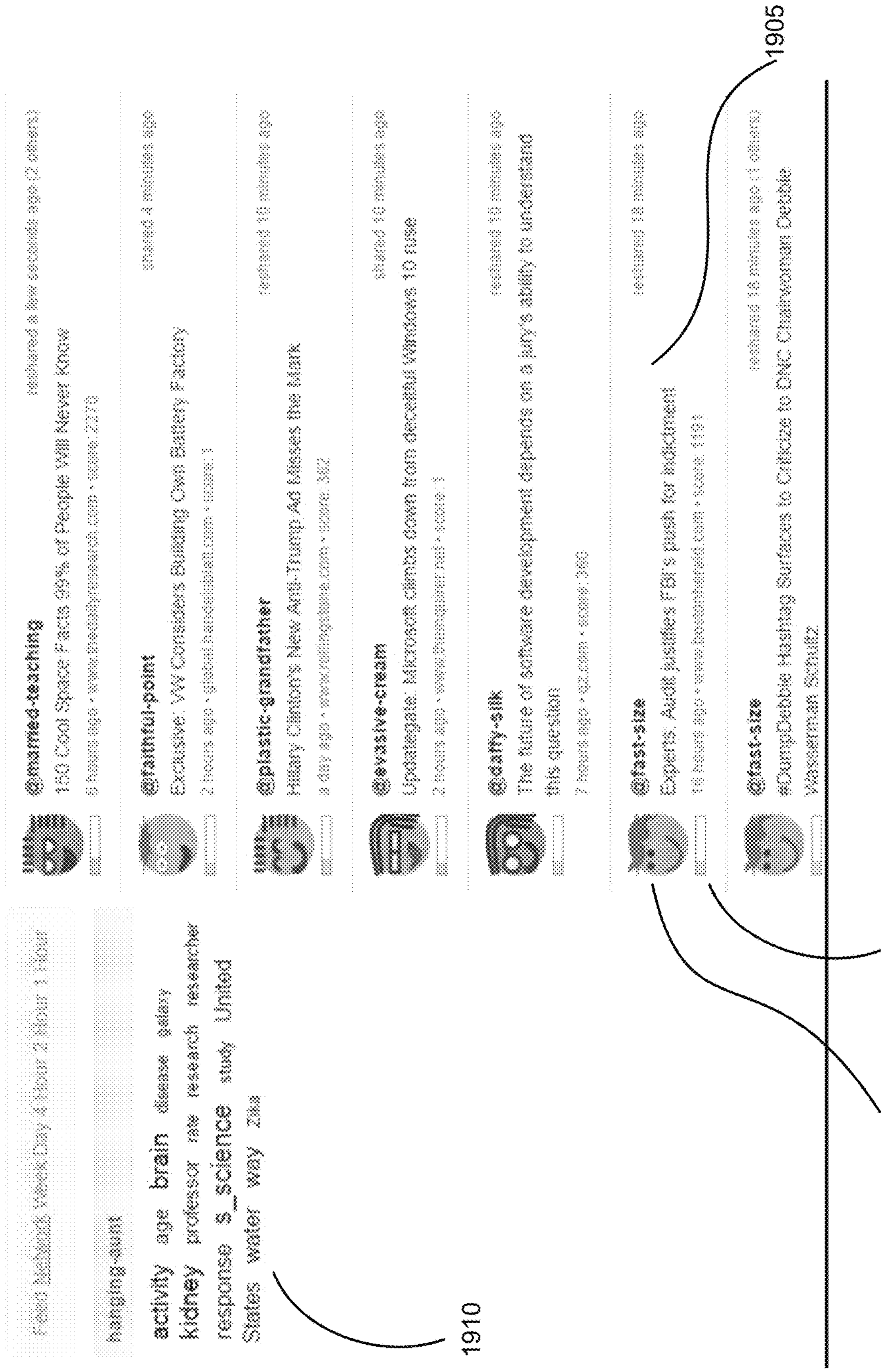
FIG. 19 illustrates another exemplary implementation of a display of information from a simulated network.

FIG. 19 illustrates another exemplary implementation of a display of information from a simulated network. A listing of items 1905 (in this case a listing of publications shared/spread by the simulated users: @married-teaching, @faithful-point, @plastic-grandfather, @evasive-cream, @daffy-silk, and @fast-size). The simulated users in this example are simulated users that were determined to have a certain similarity of terms in the profile to the comparison profile (shown representatively in the box display 1910) for the real-world user "hanging-aunt." In an alternative example, "hanging-aunt" is a simulated user profile that is matched as being similar to a real-world user profile. Display 1910 shows that the profile for "hanging-aunt" does not include a great number of terms. The terms in the profile are displayed at different sizes. Different sizes in a display can represent different levels of probabilistic value for a term (e.g., a measure of some value of probability associated with the term in the profile), different levels of occurrence of the term (e.g., in items shared and/or spread), and/or other information. Each item in listing 1905 includes a graphical avatar 1915 unique to the corresponding simulated user being displayed. Below each avatar 1915 is a display bar 1920 which represents a level of similarity between the user profile for "hanging-aunt" and the simulated user profile associated with the sharing/spreading of the item and/or the item profile corresponding to the item.

Figure 20:
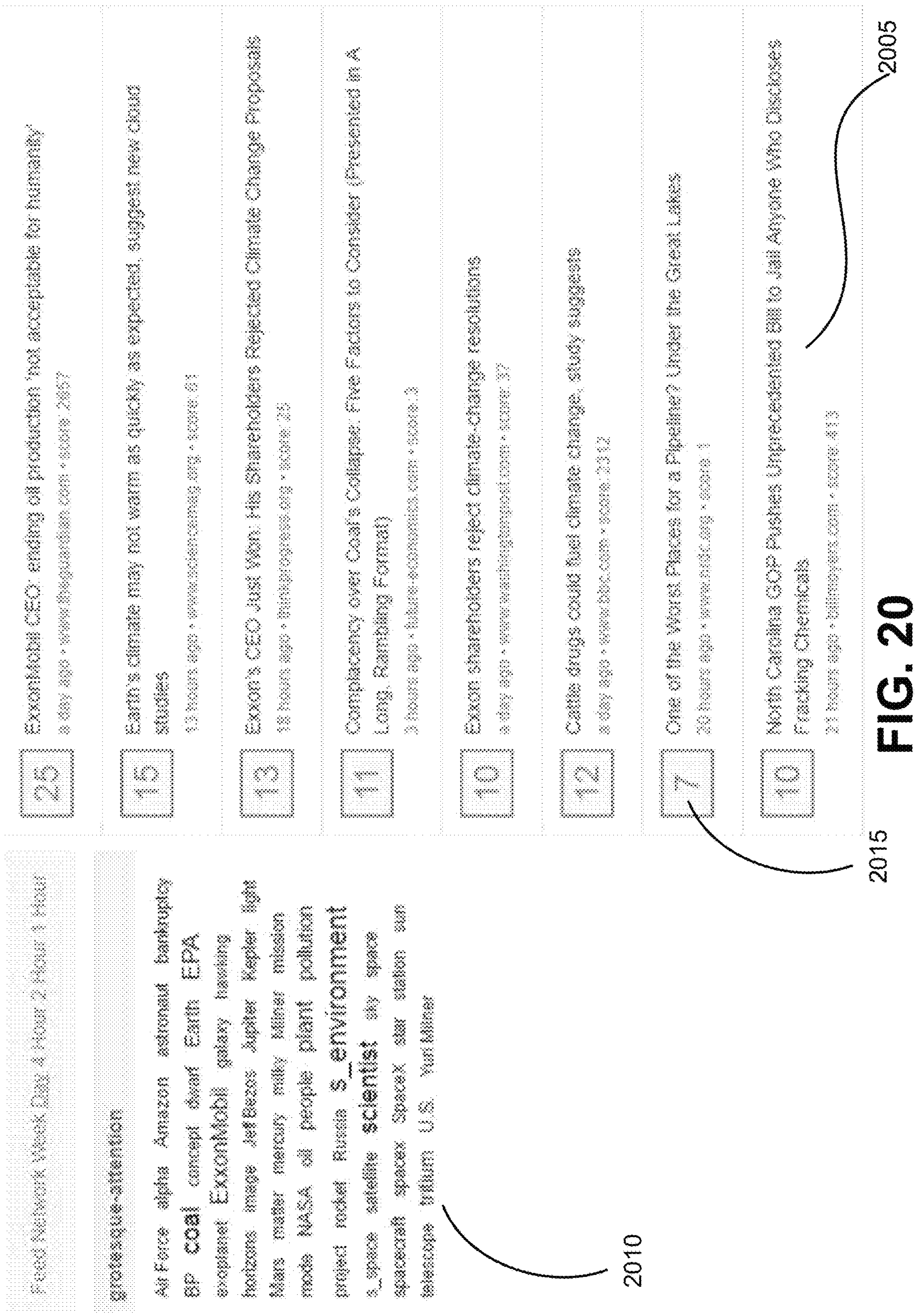
FIG. 20 illustrates yet another exemplary implementation of a display of information from a simulated network.

FIG. 20 illustrates yet another exemplary implementation of a display of information from a simulated network. A listing of items 2005 (in this case a listing of publications shared/spread by simulated users that are unidentified). The simulated users in this example are simulated users that were determined to have a certain similarity of terms in the profile to the comparison profile (shown representatively in the box display 2010) for the real-world user "grotesque-attention." In an alternative example, "grotesque-attention" is a simulated user profile that is matched as being similar to a real-world user profile. Display 2010 shows that the profile for "grotesque-attention" includes more terms than the previous example. The terms in the profile are displayed at different sizes. Each item in listing 2005 includes a graphical element 2015 that indicates the number of simulated users proximate to "grotesque-attention" that shared/spread each item. A real-world system may be connected to the simulated network to provide simulated recommendations and/or other listings of information or actions to one or more real-world users. A real-world network (such as a real-world social network or real-world e-commerce system) user (e.g., having a profile defined by the same terms as used in the first vocabulary) can be associated with one or more nodes of the simulated network. In one such example, the association is performed by comparing the similarity of the real-world network user profile to the simulated user profiles at the nodes and making associations based on a desired level of similarity. In another example, a real-world item (e.g., having a profile defined by the same terms as used in the first vocabulary) can be associated with one or more nodes of the simulated network (e.g., by comparing similarity of the real-world item profile to the simulated user profiles assigned to the one or more nodes). In yet another example, a synthetic user or item may be associated with a simulated user profile of one or more nodes of the simulated network (e.g., via similarity of like term profiles, such as terms based on the first vocabulary). A synthetic user is a user that does not exist in the simulated network or in a real-world network. A synthetic item is an item that does not exist in the simulated network but that may not be part of any real-world network. A synthetic user and/or a synthetic item can be utilized to obtain recommendations and/or other listings of information from the simulated network without the need for a real-world user or item. In one example, association of a real-world user, real-world item, synthetic user, synthetic item to the simulated user can be utilized to produce recommendations and/or other listings of information by comparison of the profile being compared to the simulated network to a history of sharing and/or spreading of items by nodes of the simulated network to which the profiles are associated.

In one exemplary implementation a method includes receiving from a real-world computer-based e-commerce system or a real-world computer-based social network a first comparison profile, the first comparison profile representing a real item or a real social network user, the first comparison profile being defined using the set of terms based on the first vocabulary; associating the first comparison profile to a set of comparison simulated user profiles including one or more of the simulated user profiles based on the similarity of terms used to define the first comparison profile and the one or more simulated user profiles; and generating a list of preferred items based on the portion of a historical record of simulated sharing and simulated spreading corresponding to the set of comparison simulated user profiles.

One or more simulated user profiles may be removed from a simulated network at any time. Additionally, one or more new simulated user profiles may be added into a simulated network at any time (e.g., to replace a profile that has been removed). Such removal and/or addition may add a way to refresh a simulated network. In one example, a new simulated user profile is added after simulating over a number of cycles. In one such example, a new simulated user profile is added after generating one or more recommendations and/or listings of information. A new simulated user profile may be such that it has no sharing and/or spreading history associated with it when added.

In one example of a simulated social networking system, the system includes: a first data store having a set of item profiles, each item profile in the set of item profiles defined using a set of terms based on a first vocabulary; a second data store having a set of simulated user profiles, each simulated user profile in the set of simulated user profiles connected to one or more other simulated user profiles via a simulated social network via a first arrangement, the first arrangement being based on the similarity of the simulated user profiles; each simulated user profile in the set of simulated user profiles defined using the set of terms based on the first vocabulary; a third data store including a historical record of a plurality of simulated shares of each of the item profiles in the set of item profiles from one or more simulated user profiles to one or more other simulated user profiles and a historical record of a plurality of simulated spreads of each shared item profile from one or more simulated user profiles to one or more other simulated user profiles, each simulated share and simulated spread being based on the similarity of the terms used to define the corresponding user profile to the terms used to define the corresponding item profile; a connection to a real-world computer-based e-commerce system or a real-world computer-based social network, the connection for receiving a first comparison profile from the e-commerce system or the social network, the first comparison profile representing a real item or a real social network user, the first comparison profile being defined using the set of terms based on the first vocabulary; and a simulation comparison processor configured to: associate the first comparison profile to a set of comparison simulated user profiles including one or more of the simulated user profiles based on the similarity of terms used to define the first comparison profile and the one or more simulated user profiles; and generate a list of preferred items based on the portion of the historical record corresponding to the set of comparison simulated user profiles.

It is noted that any one or more of the predetermined or manually set values (including thresholds and minimum value requirements) described above with respect to various implementations, embodiments, examples, etc. may be adjusted to provide a desired optimization of a simulated network (e.g., a desired optimization of sharing and/or spreading, or other simulation parameter).

It is to be noted that any one or more of details, concepts, aspects, features, characteristics, examples, and/or alternatives of a component/element, implementation, embodiment, and/or methodology described herein may be conveniently implemented using one or more machines (e.g., one or more computing devices and/or one or more simulated network systems, such as the system of FIG. 16) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above that lend themselves to employing software and/or software modules may also include appropriate hardware for assisting in the implementation of the machine executable instructions of the software and/or software module.

Such software may be a computer program product that employs a machine-readable hardware storage medium. A machine-readable hardware storage medium may be any medium that is capable of storing and/or encoding a sequence of instructions for execution by a machine (e.g., a computing device) and that causes the machine to perform any one of the methodologies and/or embodiments described herein. Examples of a machine-readable hardware storage medium include, but are not limited to, a solid state memory, a flash memory, a random access memory (e.g., a static RAM "SRAM", a dynamic RAM "DRAM", etc.), a magnetic memory (e.g., a hard disk, a tape, a floppy disk, etc.), an optical memory (e.g., a compact disc (CD), a digital video disc (DVD), a Blu-ray disc (BD); a readable, writeable, and/or re-writable disc, etc.), a read only memory (ROM), a programmable read-only memory (PROM), a field programmable read-only memory (FPROM), a one-time programmable non-volatile memory (OTP NVM), an erasable programmable read-only memory (EPROM), an electrically erasable programmable read-only memory (EEPROM), and any combinations thereof. A machine-readable hardware storage medium, as used herein, is intended to include a single medium as well as a collection of physically separate media, such as, for example, a collection of compact discs or one or more hard disc drives in combination with a computer memory. As used herein, a machine-readable storage medium does not include a signal.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Some of the details, concepts, aspects, features, characteristics, examples, and/or alternatives of a component/element discussed above with respect to one implementation, embodiment, and/or methodology may be applicable to a like component in another implementation, embodiment, and/or methodology, even though for the sake of brevity it may not have been repeated above. It is noted that any suitable combinations of components and elements of different implementations, embodiments, and/or methodologies (as well as other variations and modifications) are possible in light of the teachings herein, will be apparent to those of ordinary skill, and should be considered as part of the spirit and scope of the present disclosure. Additionally, functionality described with respect to a single component/element is contemplated to be performed by a plurality of like components/elements (e.g., in a more dispersed fashion locally and/or remotely). Functionality described with respect to multiple components/elements may be performed by fewer like or different components/elements (e.g., in a more integrated fashion).

Example benefits of a simulated network system and related methods of generating a simulated network system, operating a simulated network system, and using information from simulated sharing/spreading of items via a simulated network system to provide rich information to a real world user or a real world system may include in one or more of the implementations of the same, but are not limited to, presenting valuable information that may not be available to a real world user network/e-commerce system due to limitations of that real-world system (e.g., size, volume of item shares, etc.), allowing a real-world e-commerce system/user network to avoid contractual or other relationships with larger real-world Internet-based social networks (e.g., Facebook, Instagram) and/or e-commerce sites (e.g., Amazon), and any combinations thereof. Other benefits may also exist for various implementations. The modern Internet user networking systems can have innate limitations of size, volume and other characteristics that limit the ability to abstract desired information. In one exemplary aspect, certain implementations of a simulated network having simulated sharing/spreading using simulated user profiles and item profiles defined by the same vocabulary may provide valuable correlations that can be leveraged to real-world users and items that are part of existing real-world systems.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A method of comparing a real-world computer-based social or e-commerce network user to a computerized simulated network, the method comprising:

defining using a computerized simulated network a comparison profile for each of one or more real-world users of a real-world computer-based e-commerce system or a real-world computer-based user network, the computerized simulated network including a simulated user profile associated with each of a plurality of nodes of the computerized simulated network and a historical record of the interaction of the plurality of simulated user profiles in the computerized simulated network, each of the plurality of simulated user profiles being for a user of a set of simulated users, a proximity of each simulated user profile in the plurality of nodes being based on the similarity of simulated user profiles;

associating each comparison profile to a set of comparison simulated user profiles of the computerized simulated network, the comparison simulated user profiles including one or more of the simulated user profiles selected based on profile similarity; and providing to the one or more real-world users a listing of information based on a portion of the historical record corresponding to the set of comparison simulated user profiles.

2. A method according to claim 1, wherein the interaction of the plurality of simulated user profiles includes sharing and/or spreading of items represented by simulated item profiles across the plurality of nodes in simulated operation of the computerized simulated network.

3. A method according to claim 2, wherein an item includes an item selected from the group consisting of a publication, an audio content item, a video content item, a photographic content item, a product for sale, a service for sale, a news article, a political advocacy document, an academic journal publication, a scientific study, an advertisement, and any combinations thereof.

4. A method according to claim 2, wherein the sharing and/or spreading across the plurality of nodes in simulated operation of the computerized simulated network each represents an action including an action selected from the group consisting of a tweet of an item, a sharing of an item, a recommendation of an item, a favoriting of an item, and any combinations thereof.

5. A method according to claim 2, wherein the sharing and/or spreading across the plurality of nodes in simulated operation of the computerized simulated network is further based on a real-world rank score for the item represented by the corresponding item profile.

6. A method according to claim 5, wherein the sharing and/or spreading across the plurality of nodes in simulated operation of the computerized simulated network is further based on a time decay factor, the time decay factor representing an amount of time between the introduction of the item represented by the item profile and the simulating sharing.

7. A method according to claim 5, wherein the rank score is a ranking of the item with respect to other items based on a criteria selected from the group consisting of a sales ranking, number of views by online users on a real-world network, number of downloads by online users of a real-world network, number of times the item is connected to another item in a real-world network, and any combinations thereof.

8. A method according to claim 1, wherein the listing of information includes an information selected from the group consisting of a recommendation, a listing of actions, a recommended item, a display of terms based on a level of similarity of terms to a comparison profile, a display of terms based on a level of probability of occurrence, a news feed of items shared and/or spread by a simulated user profile in the simulated network, other information related to an item shared and/or spread in the computerized simulated network, and any combinations thereof.

9. A method according to claim 1, wherein the listing of information includes an advertisement.

10. A method according to claim 1, wherein the listing of information includes a recommendation.

11. A method according to claim 1, wherein the simulated network is based on a small world model.

12. A method according to claim 1, wherein each of the plurality of simulated user profiles includes a first set of terms based on a first vocabulary, each comparison profile being defined using a second set of terms based on the first vocabulary.

13. A method according to claim 12, wherein the first vocabulary is based on real-world data corresponding to the items represented by the simulated item profiles.

14. A method according to claim 12, wherein the first vocabulary includes a plurality of classifications for items represented by the simulated item profiles, each classification including a plurality of topics for the items, and wherein each simulated user profile is defined by one or more classifications, each of the one or more classifications having one or more topics.

15. A method according to claim 14, wherein a classification is assigned to a simulated item profile using a classification weighting factor for each classification, the classification weighting factor selected from the group consisting of a random factor, a factor of the popularity of the classification, and any combinations thereof.

16. A method according to claim 14, wherein a topic is assigned to a simulated item profile using a topics weighting factor for each topic, the topics weighting factor selected from the group consisting of a random factor, a factor of the popularity of the classification, and any combinations thereof.

17. A machine-readable hardware storage medium including machine-executable instructions for performing a method of comparing a real-world computer-based social or e-commerce network user to a computerized simulated network, the instructions comprising:

a set of instructions for defining using a computerized simulated network a comparison profile for each of one or more real-world users of a real-world computer-based e-commerce system or a real-world computer-based user network, the computerized simulated network including a simulated user profile associated with each of a plurality of nodes of the computerized simulated network and a historical record of the interaction of the plurality of simulated user profiles in the computerized simulated network, each of the plurality of simulated user profiles being for a user of a set of simulated users, a proximity of each simulated user profile in the plurality of nodes being based on the similarity of simulated user profiles;

a set of instructions for associating each comparison profile to a set of comparison simulated user profiles of the computerized simulated network, the comparison simulated user profiles including one or more of the simulated user profiles selected based on profile similarity; and a set of instructions for providing to the one or more real-world users a listing of information based on a portion of the historical record corresponding to the set of comparison simulated user profiles.

18. A machine-readable hardware storage medium according to claim 17, wherein the listing of information includes an information selected from the group consisting of a recommendation, a listing of actions, a recommended item, a display of terms based on a level of similarity of terms to a comparison profile, a display of terms based on a level of probability of occurrence, a news feed of items shared and/or spread by a simulated user profile in the simulated network, other information related to an item shared and/or spread in the computerized simulated network, and any combinations thereof.

19. A machine-readable hardware storage medium according to claim 18, wherein an item includes an item selected from the group consisting of a publication, an audio content item, a video content item, a photographic content item, a product for sale, a service for sale, a news article, a political advocacy document, an academic journal publication, a scientific study, an advertisement, and any combinations thereof.

20. A machine-readable hardware storage medium according to claim 17, wherein the listing of information includes a recommendation.

* * * * *